(12) United States Patent　　　(10) Patent No.:　US 12,672,605 B2
Baert　　　　　　　　　　　　　　(45) Date of Patent:　　　Jul. 7, 2026

(54) HEMP PICKING MACHINE FOR PICKING HEMP

(71) Applicant: HYLER BV, Sint-Baafs-Vijve (BE)

(72) Inventor: Niels Baert, Sint-Baafs-Vijve (BE)

(73) Assignee: HYLER BV, Sint-Baafs-Vijve (BE)

( * ) Notice: Subject to any disclaimer, the term of this patent is extended or adjusted under 35 U.S.C. 154(b) by 440 days.

(21) Appl. No.: 18/259,208

(22) PCT Filed: Dec. 23, 2021

(86) PCT No.: PCT/EP2021/087604

§ 371 (c)(1),
(2) Date: Jun. 23, 2023

(87) PCT Pub. No.: WO2022/136687

PCT Pub. Date: Jun. 30, 2022

(65) Prior Publication Data

US 2024/0298575 A1　　Sep. 12, 2024

(30) Foreign Application Priority Data

Dec. 24, 2020　(BE) .................................. 2020/5984

(51) Int. Cl.
*A01D 45/06*　　　(2006.01)
*A01D 61/00*　　　(2006.01)
(52) U.S. Cl.
CPC ......... *A01D 45/065* (2013.01); *A01D 61/008* (2013.01)
(58) Field of Classification Search
CPC ........................... A01D 45/065; A01D 61/008
See application file for complete search history.

(56) References Cited

U.S. PATENT DOCUMENTS

| | | | | | |
|---|---|---|---|---|---|
| 358,062 | A | * | 2/1887 | Noyes | A01D 45/065 |
| | | | | | 56/182 |
| 703,328 | A | * | 6/1902 | Whitely | A01D 39/00 |
| | | | | | 56/471 |
| 2,291,093 | A | * | 7/1942 | Magruder | A01D 45/06 |
| | | | | | 56/103 |
| 3,399,517 | A | * | 9/1968 | Magee | A01D 47/00 |
| | | | | | 56/238 |

(Continued)

FOREIGN PATENT DOCUMENTS

| | | | | |
|---|---|---|---|---|
| CA | 3210194 A1 | * | 2/2024 | A01D 57/20 |
| CN | 107371587 A | * | 11/2017 | B63B 35/00 |

(Continued)

OTHER PUBLICATIONS

International Search Report and Written Opinion of the ISA for PCT/EP2021/087604 dated Mar. 23, 2022, 15 pages.

*Primary Examiner* — Arpad Fabian-Kovacs
(74) *Attorney, Agent, or Firm* — NIXON & VANDERHYE

(57)　　　　　　　ABSTRACT

A hemp machine for processing hemp includes a self-propelling vehicle including a vehicle chassis and a hemp picking unit mounted on the vehicle chassis for the purpose of picking the hemp plants. The hemp picking unit comprises a first picking element embodied to pick the lower part of the hemp plants and a second picking element embodied to pick the upper part of the hemp plants. The second picking element has a cutting unit for cutting the hemp plants at a position between the upper and lower part of the hemp plants.

26 Claims, 14 Drawing Sheets

(56)          References Cited

U.S. PATENT DOCUMENTS

| | | | | | |
|---|---|---|---|---|---|
| 3,596,448 | A | * | 8/1971 | Van Buskirk | A01D 45/021 |
| | | | | | 56/95 |
| 3,791,114 | A | * | 2/1974 | Fowler | A01D 45/10 |
| | | | | | 56/317 |
| 4,715,174 | A | * | 12/1987 | Lloyd | A01D 75/00 |
| | | | | | 56/297 |
| 5,632,135 | A | * | 5/1997 | Baker, IV | A01D 45/065 |
| | | | | | 460/24 |
| 2005/0050875 | A1 | * | 3/2005 | Alsobrook | A01D 33/10 |
| | | | | | 56/327.1 |
| 2016/0183462 | A1 | * | 6/2016 | Magisson | A01D 41/14 |
| | | | | | 56/192 |
| 2018/0014462 | A1 | * | 1/2018 | Borry | A01D 41/142 |
| 2020/0253120 | A1 | * | 8/2020 | Hefner | A01D 34/42 |
| 2023/0026343 | A1 | * | 1/2023 | Dillon | A01D 57/04 |
| 2024/0049640 | A1 | * | 2/2024 | Baert | G05D 1/0094 |
| 2024/0276918 | A1 | * | 8/2024 | Baert | A01D 69/03 |

FOREIGN PATENT DOCUMENTS

| | | | | | | |
|---|---|---|---|---|---|---|
| CN | 110892819 | A | * | 3/2020 | ............. | A01D 45/04 |
| DE | 19744988 | A1 | * | 4/1999 | ............. | A01D 45/06 |
| EP | 2556740 | A1 | | 2/2013 | | |
| EP | 3272202 | A1 | * | 1/2018 | ............. | A01D 45/06 |
| FR | 1281756 | A | * | 1/1962 | ............. | A01D 45/06 |
| FR | 2662906 | B1 | * | 8/1992 | ............. | A01D 45/06 |
| FR | 2866516 | A1 | | 8/2005 | | |
| FR | 2885009 | A1 | | 11/2006 | | |
| FR | 3066881 | B1 | | 12/2018 | | |
| FR | 3097717 | B1 | * | 9/2021 | ............. | A01D 45/06 |
| JP | H09154369 | A | * | 6/1997 | ............. | A01D 49/00 |
| WO | WO-9853660 | A1 | * | 12/1998 | ............. | A01D 41/14 |
| WO | 2005082126 | A1 | | 9/2005 | | |
| WO | WO-2009095763 | A2 | * | 8/2009 | ............. | A01D 75/28 |
| WO | WO-2021005466 | A1 | * | 1/2021 | ............. | A01D 57/20 |
| WO | WO-2022106887 | A1 | * | 5/2022 | ............. | B62D 53/02 |
| WO | WO-2023095011 | A1 | * | 6/2023 | ........... | A01D 45/065 |

* cited by examiner

HEMP PICKING MACHINE FOR PICKING HEMP

This application is the U.S. national phase of International Application No. PCT/EP2021/087604 filed Dec. 23, 2021 which designated the U.S. and claims priority to BE Patent Application No. 2020/5984 filed Dec. 24, 2020, the entire contents of each of which are hereby incorporated by reference.

The present invention relates to a hemp picking machine for picking and processing hemp plants.

Numerous different machines have been developed over time for harvesting and subsequent processing of fibre plants. On one hand there are picking machines with which the fibre plants can be picked and with which the picked fibre plants can be placed flat on the ground surface in rows (swathes). On the other hand so-called turners have been developed with which fibre plants, once they have been placed down flat on the ground at an earlier stage, can be picked up, be turned over and can be placed back onto the ground in turned-over position. Numerous variants of these two types of processing machine are in turn known. All these variants are however configured only to turn relatively short fibre plants, such as flax. Considering the great differences in properties between the different fibre plants, including the properties such as length, but also the composition of the plants, a separate processing machine is in principle utilized for each processing step and for each fibre plant. It has as yet not been found possible to develop a processing machine with which the different types of fibre plant and/or different types of processing thereof can be realized in one machine.

It is an object of the invention to provide a hemp picking machine in which hemp can be picked and further processed in efficient manner.

According to a first aspect, at least one of these objects is achieved in a hemp picking machine for picking and processing hemp plants, the hemp picking machine comprising:

a self-propelling vehicle comprising a vehicle chassis with at least a conveyor for transporting picked and processed hemp plants in at least two streams from a first end to an opposite second end, and at least a delivering unit provided at or close to the second end for the purpose of receiving the respective streams of picked, processed and transported hemp plants and then placing the received hemp plants on the ground in at least two rows;

a hemp picking unit mounted or mountable on the vehicle chassis and configured to pick the hemp plants, wherein the hemp picking unit comprises:

a first picking element embodied to pick the lower part of the hemp plants;

a second picking element embodied to pick the upper part of the hemp plants;

wherein the first picking element has a first transport installation configured to grip the part of the hemp plants being the lower part relative to the ground surface, pull the gripped hemp plants from the ground along with the roots, and transport the lower parts of the hemp plants to the conveyor of the vehicle;

wherein the second picking element has a cutting unit for cutting the hemp plants at a position between the upper and lower part of the hemp plants and wherein the second picking element has a second transport installation configured to grip the part of the hemp plants being the upper part relative to the ground and to transport the upper parts of the hemp plants to the conveyor of the vehicle, and wherein the cutting unit is configured to cut the hemp plants during transport.

In an embodiment the first and second picking element are arranged relative to each other such that during travel of the vehicle the second picking element first grips and cuts loose the upper parts of the hemp plants and only then does the first picking element grip the lower parts of the hemp plants.

In an embodiment the engaging position of the second transport installation on the hemp plants is situated at a greater distance from the first end of the vehicle than the engaging position of the first transport installation. The result hereof is that the upper part of the hemp plants is first gripped by the second transport installation and only then does the cutting loose of the upper part of the hemp plants take place, after which gripping of the lower part of the hemp plants by the first transport installation and subsequent pulling of the lower part of the hemp plants from the ground occurs.

In an embodiment of the invention the difference ($\Delta a$) between a first distance ($a_1$) of the first end of the vehicle to the engaging position of the second transport installation and a second distance ($a_2$) of the first end of the vehicle to the engaging position of the first transport installation is at least 10 cm, preferably between 15 cm and 250 cm.

This distance ensures that the upper picking element is given time to grip and cut off the hemp plants before the lower picking element begins engaging these same hemp plants.

In a further embodiment the conveyor of the vehicle is configured to receive the upper parts and lower parts of the picked hemp plants separately and to deliver the received and transported upper parts and lower parts of the picked hemp plants separately.

In a further embodiment the conveyor of the vehicle comprises:

a first conveyor configured to receive the upper parts of the hemp plants from the second picking element;

a second conveyor, substantially parallel to the first conveyor and configured to receive the lower parts of the hemp plants from the first picking element.

In a further embodiment the transport installations are configured to rotate the hemp plants during transport, particularly to rotate the hemp plants from a substantially upright position to a substantially lying position.

In a further embodiment the cutting unit is mounted on the second picking element.

In a further embodiment the cutting unit comprises at least a displaceable support which is arranged on the upper picking element or is formed integrally therewith.

In a further embodiment the displaceable support comprises a remotely controllable actuator for remotely controlling the adjustment of the height of the cutting unit relative to the rest of the upper picking element.

In a further embodiment the hemp picking machine comprises a root cutting unit configured to cut a root part off the lower parts of the hemp plants, wherein the root cutting unit is preferably mounted on the first picking element and/or wherein the root cutting unit is preferably configured to cut off the root parts when the lower parts of the hemp plants are in a substantially upright position.

In a further embodiment the root cutting unit comprises at least a remotely controllable actuator, for instance an extendable cylinder or electric motor, for remotely controlling the adjustment of the height of the root cutting unit.

In a further embodiment the hemp picking machine comprises root part discharge means for discharging the cut-off root parts from the root cutting unit to the ground, wherein the root part discharge means are preferably configured for depositing on the ground in front of one or more wheels of the vehicle in axial direction.

In a further embodiment the hemp picking machine comprises a top cutting unit configured to cut a top part off the upper parts of the hemp plants, wherein the top cutting unit is preferably mounted on the second picking element.

In a further embodiment the top cutting unit is arranged on the picking element for lateral displacement and is provided here with at least one actuator for setting the lateral cutting position of parts of the hemp plants to be transported to respectively the first and second conveyor on the vehicle by displacing the relevant cutting unit in lateral direction.

In a further embodiment the top cutting unit is configured to cut off the top parts when the upper parts of the hemp plants are in a substantially lying position.

In a further embodiment the hemp picking machine comprises first discharge means for discharging the cut-off top parts from the top cutting unit to a collecting element on the self-propelling vehicle, wherein the first discharge means preferably comprise a discharge conduit and a discharge pump for collecting and extracting cut-off top parts.

In a further embodiment the hemp picking machine comprises first lifting means, arranged between the vehicle chassis and the first picking element for the purpose of setting the pivot position of the first picking element relative to the vehicle chassis.

In a further embodiment the hemp picking machine comprises further lifting means, arranged between the vehicle chassis and the first picking element and/or between the first and second picking element, configured to set the pivot position of the second picking element relative to respectively the vehicle chassis and/or the first picking element.

In a further embodiment the transport installations each comprise at least one pair of endless conveyor belts which are trained over pulleys and are configured to grip the hemp plants therebetween and transport the hemp plants in gripped state.

In a further embodiment the hemp picking machine comprises one or more hydraulic motors and/or electric motors configured to drive one or more of the pulleys of the endless conveyor belts of the transport installations, wherein a hydraulic motor is preferably embodied such that a single motor drives one or two pulleys.

In a further embodiment the hemp picking machine comprises one or more electric motors configured to drive one or more of the pulleys of the endless conveyor belts of the transport installations.

In a further embodiment the upper pivotable picking element is arranged pivotally on the first pivotable picking element.

In a further embodiment both the upper and the lower picking element can be coupled to the vehicle chassis via hinges.

In a further embodiment compacting means are provided for compacting the hemp plant parts transported by the second picking element. The compacting means can comprise pressing rollers for pressing the hemp plants transported therealong.

In a further embodiment a collecting element is provided for collecting and storing cut-off parts of picked hemp plants therein.

According to another aspect, a method is provided for picking and processing hemp plants, the method comprising of driving the vehicle over a ground surface and, while travelling over the ground surface:

gripping hemp plants rooted in the ground with an upper picking element;

cutting the upper parts of the hemp plants loose from the lower parts;

gripping the remaining lower parts of the hemp plants which are rooted in the ground and from which the upper parts have been cut loose using a lower picking element after the upper parts have been cut loose;

pulling the lower parts from the ground along with the roots using the first picking element;

transporting the first parts and second parts of the hemp plants to one or more delivering units;

placing the received parts of the hemp plants on the ground in at least two rows by means of the delivering units.

The method can comprise of, during travel of the vehicle, first picking and cutting loose the upper parts of the hemp plants by means of the second picking element and only then gripping the lower parts of the hemp plants by means of the first picking element. The method can also comprise of receiving the upper parts and lower parts of the picked hemp plants separately and delivering the received and transported upper parts and lower parts of the picked hemp plants separately.

In determined embodiments the method comprises of receiving the upper parts of the hemp plants from the second picking element by means of a first conveyor and receiving the lower parts of the hemp plants from the first picking element by means of a separate, second conveyor.

In determined embodiments the method comprises of placing the first and second parts on the ground surface separately.

In determined embodiments the method comprises of rotating the hemp plants during transport, particularly rotating the hemp plants from a substantially upright position to a substantially lying position.

In determined embodiments the method comprises of pivoting the first picking element and/or the second picking element relative to the vehicle, preferably also of pivoting the cutting unit relative to the second picking element, for the purpose of setting the length ($l_o$) of the lower parts and the length ($l_b$) of the upper parts of the fibre plants.

In determined embodiments the method comprises of cutting the top parts off the upper parts which have been cut loose and/or cutting the root parts off lower parts of the fibre plants.

In determined embodiments the method comprises of compacting the upper parts of the fibre plants.

Further advantages, features and details of the invention will be elucidated with reference to the following description of some embodiments thereof. Reference is made in the description to the accompanying figures, in which:

Figure 10:
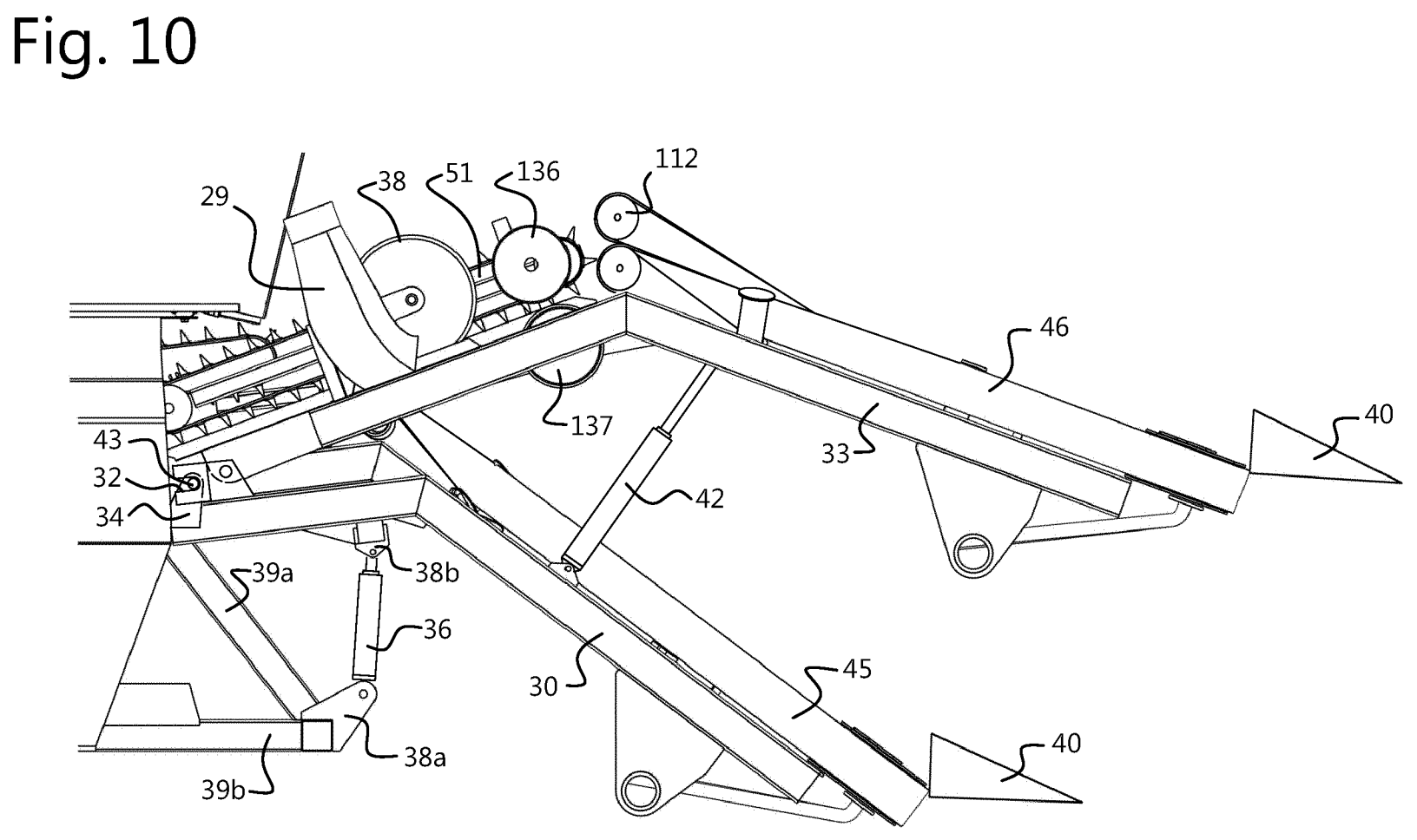

FIG. 10 is a further side view of the embodiment of FIG. 5;

Figure 11:
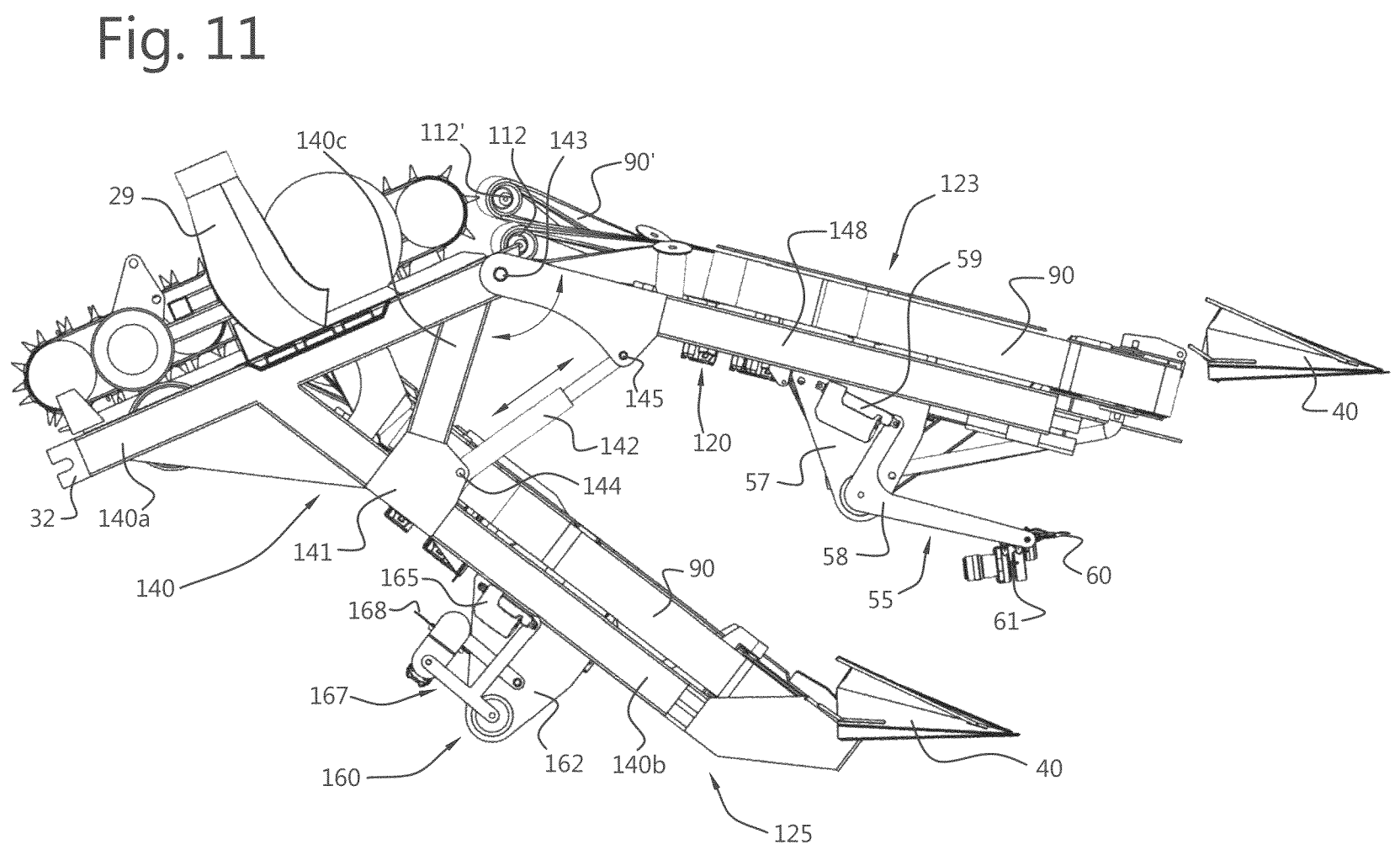
Figure 12:
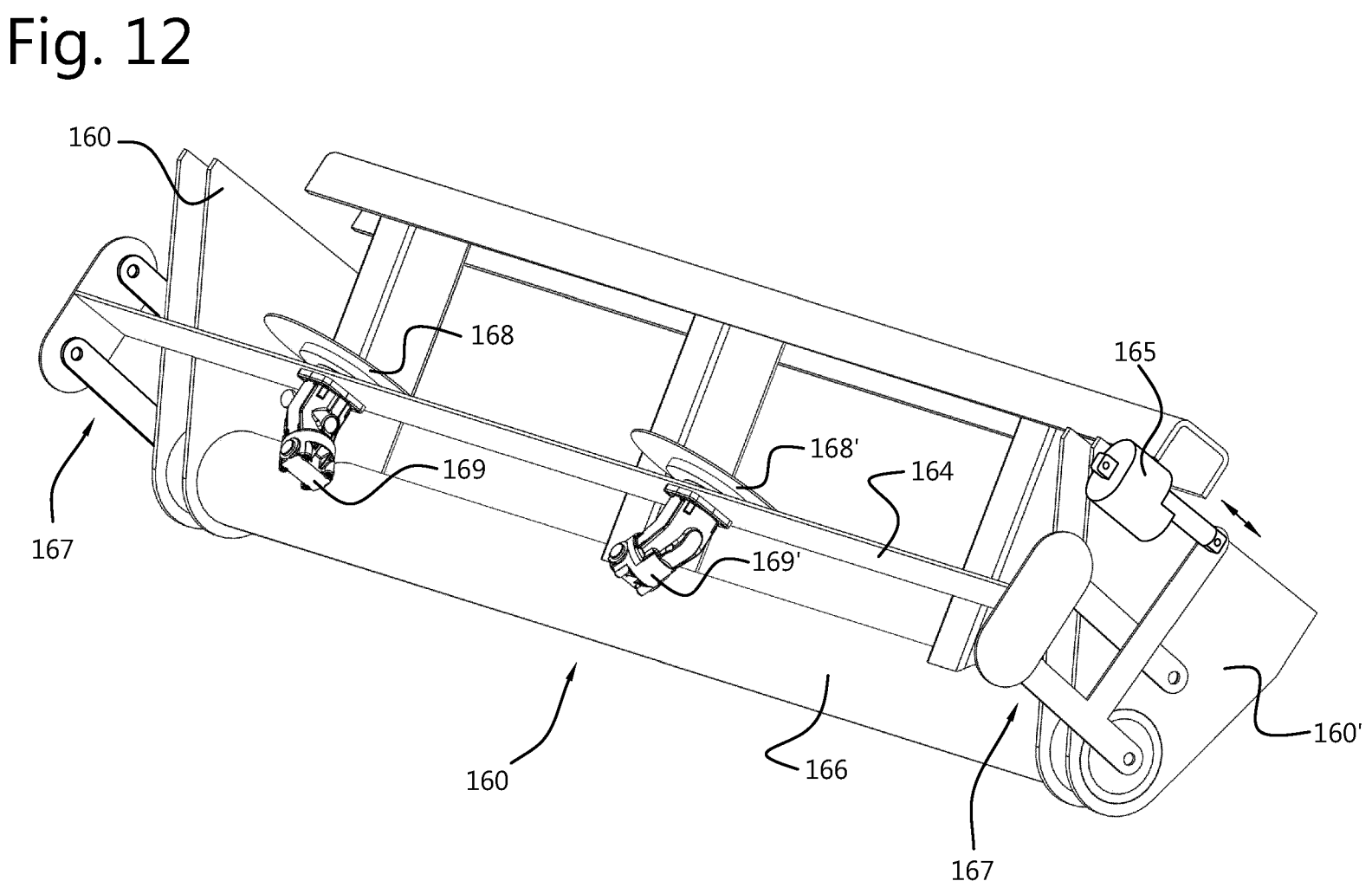
Figure 13:
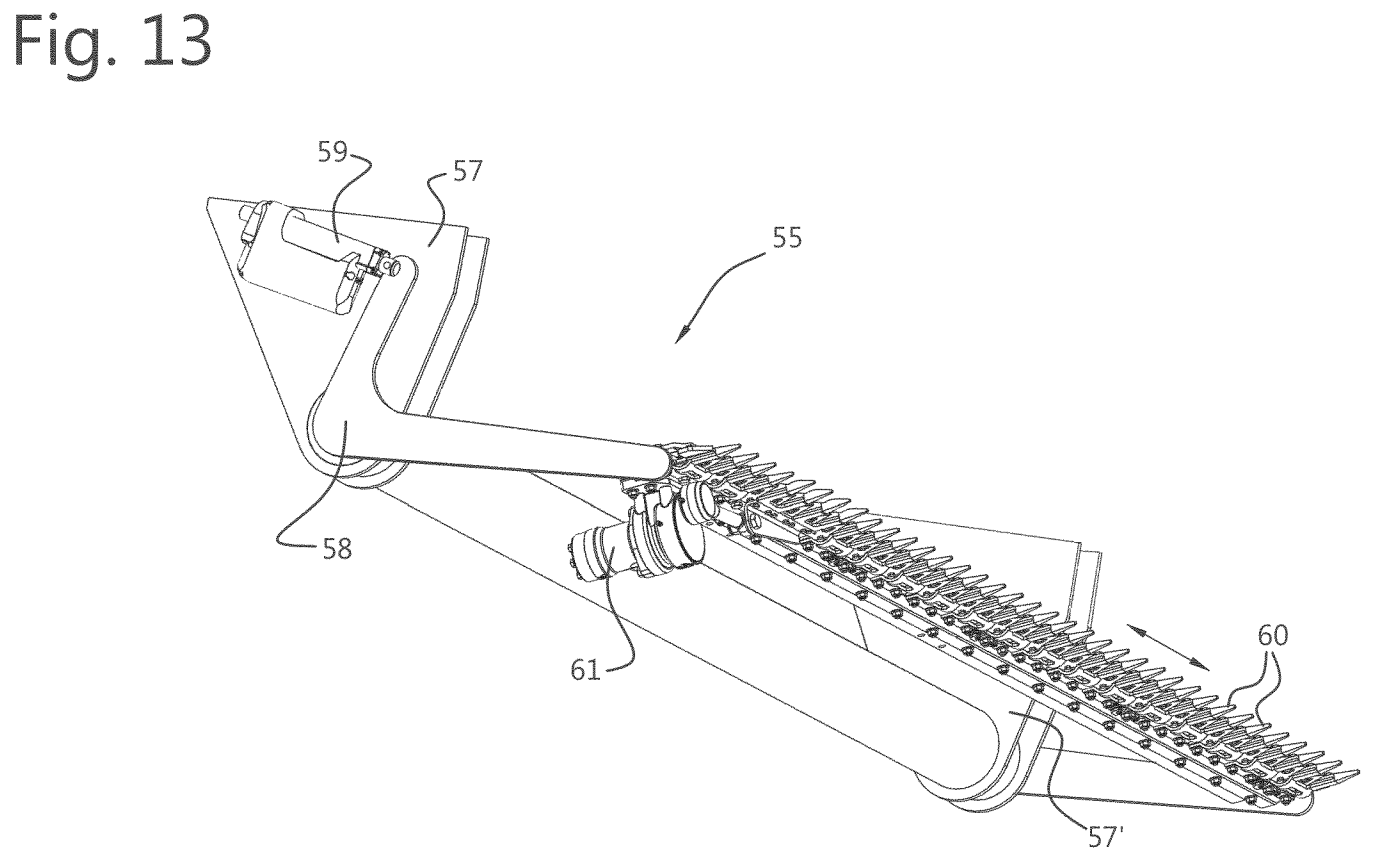
Figure 1:
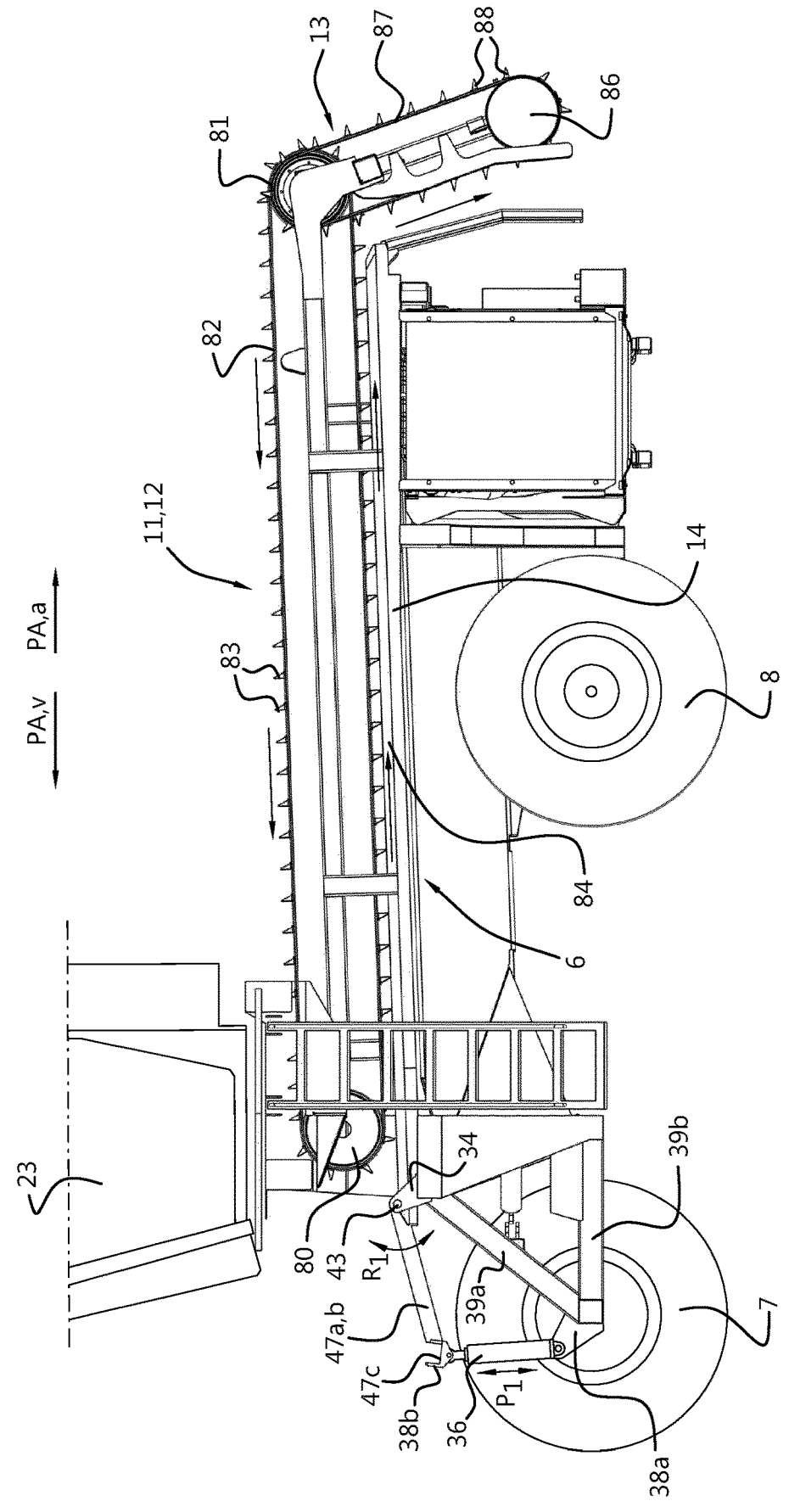
FIG. 1 is a partially cut-away side view of an embodiment of a vehicle according to the invention.

FIGS. 11-13 are views of a further embodiment of the hemp machine according to the invention, wherein FIG. 11 is a side view of a further embodiment of a hemp picking unit with an alternative mounting of the picking elements on each other and on the vehicle chassis, FIG. 12 a detail view of the root cutting unit of FIG. 11, and FIG. 13 is a view of the cutting unit or mowing unit for cutting loose the upper parts of fibre plants from the lower parts thereof, as can be applied in all embodiments.

Flax is a fibre crop which is cultivated for making linen, among other things. The flax plant is usually between 80 and 120 cm long, and is harvested using a drawn or self-propelling flax picking machine. For this purpose the flax picking machine has on the front side a picking unit embodied specifically to pull the flax plants from the ground. The harvested flax plants are then processed by the flax picking machine by displacing them to the rear side of the flax picking machine and placing the flax plants on the ground surface during travel. The flax plants are placed flat on the ground in long rows, also referred to as "swathes", wherein the stems of the harvested flax plants extend substantially transversely of the longitudinal direction of the swathes. This placing back of the flax flat onto the ground surface so that said swathes are created is also referred to as "depositing" or "picking up". When the flax plants are placed in rows or swathes, an intermediate space is left between adjacent rows. These spaces are provided in order to prevent the swathes from becoming tangled in each other.

The harvested flax plants which were placed flat on the ground in swathes are then retted under the influence of a combination of dew, rain and sunlight. The retting of the flax by leaving the flax plants on the ground (i.e. a field or retting field) for some time is referred to in the field of processing flax as field retting or dew retting. In order to obtain a uniform retting and to prevent rotting of the flax, the flax placed flat on the ground in rows must be flipped over regularly. This flipping over of the flax placed flat on the ground is also referred to as "turning". The turning of the flax is performed using a drawn or self-propelling flax turner.

Hemp is likewise a fibre crop which is cultivated for making textile fabrics or rope, among other things. The hemp plant is a lot longer than the flax plant. The hemp plant is characteristically between 140 cm and 240 cm in length. The hemp is usually cut at the base of the hemp plant and then processed further.

This would therefore already necessitate at least four different machines to enable optimal processing of both hemp and flax. This results in high purchase, use and maintenance costs. In embodiments of the present invention a processing machine is provided which is suitable in principle for harvesting/picking and/or turning relatively long fibre plants such as hemp or kenaf and relatively short fibre plants such as flax.

FIG. 1 shows a self-propelling vehicle 2 of a processing machine 1 according to a determined embodiment of the invention. Self-propelling vehicle 2 comprises a vehicle chassis 6 on which four wheels, i.e. two front wheels 7 and two rear wheels 8, are arranged in known manner. In FIG. 1 a part of the front left side of the vehicle has been cut away (i.e. the front left wheel and the relevant part of the wheel suspension) in order to obtain a better view of the construction of the vehicle on the front side. The vehicle is self-propelling, which means that it is provided with its own drive motor whereby a number of the wheels, for instance the two rear wheels, or all the wheels can be driven. The vehicle is steered from a driver's cab 23 on the front side of the vehicle. Chassis 6 comprises two parallel conveyors 11, 12 formed by a loading floor or platform 14 and two endless conveyor belts provided thereabove. At least one of the endless conveyor belts can here be adjusted in lateral direction so that the intermediate distance between the two conveyor belts can be adjusted, this in order to realize a suitable intermediate distance for shorter or longer swathes. Referring to the top view of FIG. 2, the two conveyors 11, 12 are arranged along both longitudinal edges of vehicle 2 so that a quantity of fibre plants can be transported in axial rearward direction ($P_{A,a}$) with each of these. In the shown embodiment each of the conveyors 11, 12 comprises an endless conveyor belt 82 which runs on a front roller 80 and a rear roller 81. At least one of the rollers 80, 81 is driven via a drive (not shown). In a determined embodiment the drive comprises a hydraulic motor arranged in the rear (triple) pulley or roller 81. Each of the respective part-rollers of the multiple (triple) pulley is driven separately yet synchronously to each other, preferably according to a determined ratio as desired. So-called carriers 83 are provided on the outer side of conveyor belt 82. These can displace the fibre plants lying on platform 14, at least on guide rails 84 of the platform (FIG. 1), in said axial rearward direction ($P_{A,a}$) to the rear side of chassis 6. The fibre plants are thus enclosed here between conveyor belt 82 and guide rails 84.

Figure 2:
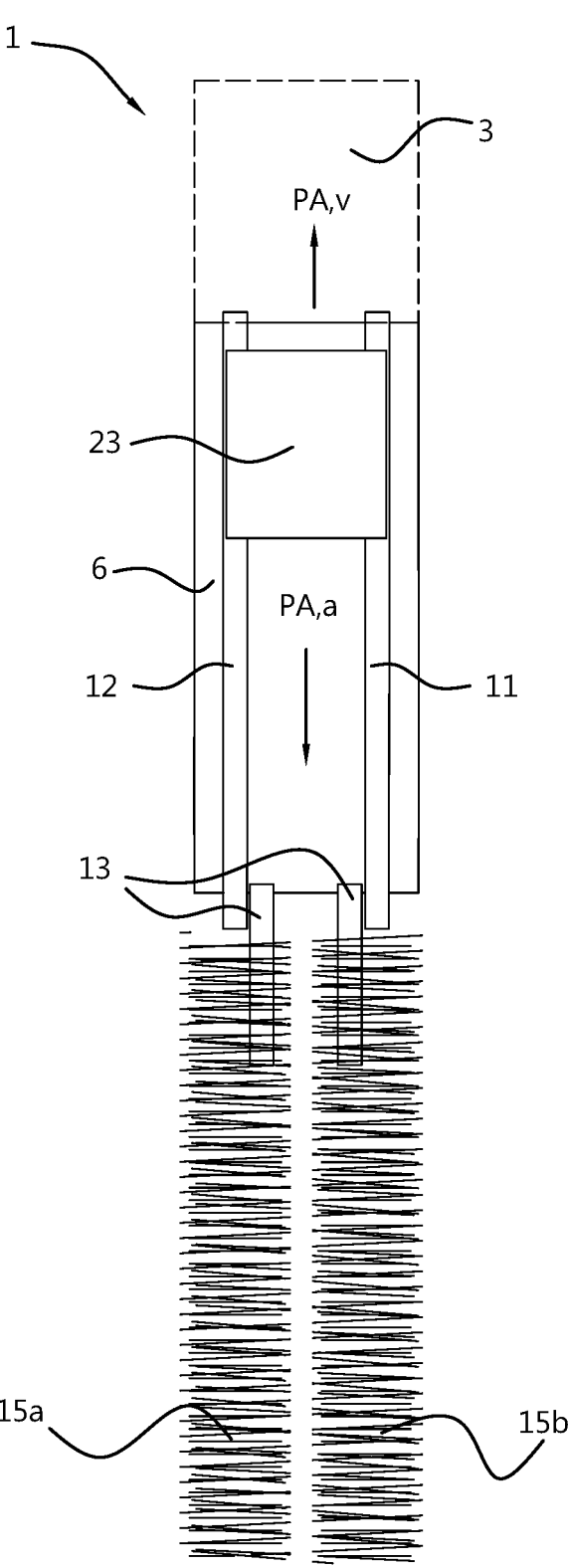
FIG. 2 is a schematic top view of the vehicle of FIG. 1, provided on the front side with a processing unit.

On the rear side of vehicle 2 a delivering unit 13 is arranged for each conveyor 11, 12. In the shown embodiment the delivering unit 13 comprises an endless belt conveyor 87. The endless belt of each of the endless belt conveyors 87 is trained around a roller 86 and around said roller 81 (a belt conveyor 87 therefore sharing this with a conveyor 11 or 12). Driving of delivering unit 13 takes place the first roller 81. This extends obliquely rearward to some extent and is configured to displace the fibre plants coming from respective conveyor 11, 12 downward in dosed and controlled manner so that the fibre plants can be placed on the ground on the rear side of the vehicle. As shown in FIG. 2, when the vehicle moves in an axial forward direction ($P_{A,v}$), the fibre plants (v) picked or picked up on the front side of the vehicle will be displaced to the rear side of vehicle 2 and will each be placed down on the ground (o) in a separate row 15a, 15b via delivering units 13. In determined applications the rows 15a, 15b of fibre plants are composed of the same parts of the fibre plant, for instance in the case of the relatively short flax plants. In other embodiments the one row is however composed of the lower portions of the harvested fibre plants, while the other row consists of the upper portions of the harvested fibre plants. This is for instance the case when hemp plants are harvested. In both cases the fibre plants are placed flat on the ground, parallel to each other as far as possible, after which said retting can commence.

Vehicle 2 is provided with a processing unit 3 on its front side in order to be able to pick the fibre plants or to be able to pick fibre plants already placed flat on the ground at an earlier stage back up again. A picking unit is arranged on the front side in the case that the fibre plants are being picked, while a processing unit 3 will be a pick-up unit in cases where fibre plants which have already been picked and placed on the ground previously are being picked up. A different picking unit will further be mounted on the vehicle depending on the length of the crop to be picked.

Figure 3:
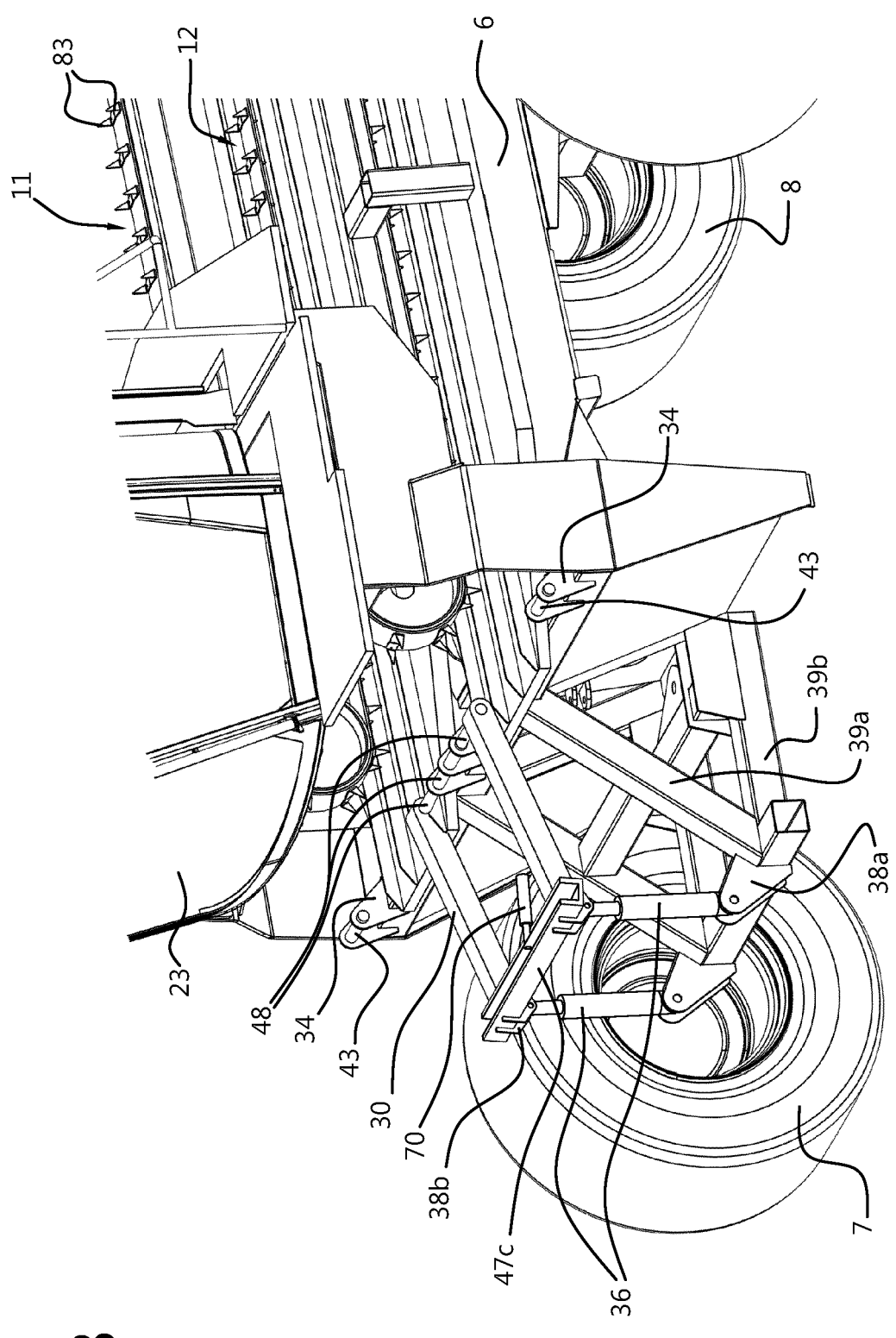
FIG. 3 is a partially cut-away perspective side view of the embodiment of the vehicle according to FIGS. 1 and 2.

Referring to FIGS. 1 and 3 in particular, the chassis comprises on the front side of chassis 6 of vehicle 2 a number of support chassis parts 39a, 39b. The support chassis parts 39b extend in line with the rest of chassis 6 of vehicle 2, while the support parts 39a mounted on support parts 30b and the rest of chassis 6 are disposed obliquely. Chassis 6 is further provided with a number of hinges 48 on which two parallel longitudinal lifting arms 47a, 47b are arranged. Both longitudinal lifting arms 47a, 47b are connected at their outer ends to a transverse lifting arm 47c. The support chassis parts 39a, 39b, longitudinal lifting arms 47a, 47b and transverse lifting arm 47c together form a strong and stable support structure for mounting a number of actuators whereby a processing unit 3 coupled to the chassis 6 of vehicle 2 can be pivoted upward and downward. Together with these actuators the support structure forms the above stated lifting unit.

The pivoting of processing unit 3 is brought about by a number of actuators, for instance electric motors or, preferably, lifting cylinders 36, of the lifting unit. In FIGS. 1 and 3 the actuators are formed by two lifting cylinders 36. In the shown embodiment two lifting cylinders positioned laterally adjacently of each other are provided. In other embodiments use is however only made of a single lifting cylinder, or three or more lifting cylinders are applied. The lifting cylinders are mounted pivotally on the support chassis parts 39a, 39b via hinges 38 and on transverse lifting arm 47c via a mounting support 38b. A further description of the construction of the lifting unit and of the operation thereof will follow below.

Referring to FIG. 3, chassis 6 is provided on either side of the support chassis parts 39a, 39b with first mounting means 34 for mounting a processing unit 3 thereon in pivotable and releasable manner. The first mounting means 34 can be embodied in numerous ways, but in the shown specific embodiment comprise a number of flanges in which respective pivot shafts 43 can be rotatably mounted.

Each of the different processing units 3 comprises one or more frame parts which can be mounted in pivotable and releasable manner on said first mounting means 34. In the embodiments shown in FIGS. 4-9 the processing unit 3 comprises a first, lower hemp picking element 25 and a second, upper hemp picking element 26 placed thereabove. The lower hemp picking element comprises a frame part 30 which can be mounted pivotally and in easily releasable manner on first mounting means 34 of the vehicle using second mounting means 32. The upper hemp picking element 26 comprises a frame part 33 which also takes a pivotable (yet not necessarily easily releasable) form, albeit that in the shown embodiment frame part 33 of the upper hemp picking element 26 is mounted on the frame part 30 of the lower hemp picking element 25 instead of directly on chassis 6 of the vehicle. In other embodiments (not shown) it is however precisely the upper hemp picking element that is mounted on chassis 6 of vehicle 2, and the lower hemp picking element on the upper hemp picking element. In still further embodiments (not shown) the two hemp picking elements are mounted pivotally and releasably on vehicle 2.

For mounting on the chassis 6 of vehicle 2, more particularly on the first mounting means 34 thereof, such as the flanges 34 positioned on or close to the sides of vehicle 2 and having the pivot shafts 43 mounted therein, the processing unit 3, in the shown embodiment the lower hemp picking element 25, is provided with second mounting means 32. The second mounting means 32 are embodied for easy mounting on first mounting means 34. The first and second mounting means 34, 32 together form a mounting hinge between processing unit 3 and vehicle 2, such that processing unit 3 can be pivoted in upward and downward direction around the lying pivot shafts 43 (pivoting direction $R_1$, FIG. 9).

To make processing unit 3 pivot relative to vehicle 2 the above-described lifting unit is utilized. As described above, the lifting cylinders 36 are arranged rotatably on the flanges 38a of chassis 6 at one outer end. On their opposite sides the lifting cylinders 36 are coupled via mounting supports 38b to the transverse lifting arm 47c. Transverse lifting arm 47c of the lifting unit has a substantially U-shaped cross-section, which is clearly visible particularly in FIGS. 1 and 3. The U-shape forms a receiving space for a part of the frame part 30 of the lower hemp picking element 25. In other words, the processing unit 3 can be connected to the lifting unit in simple manner by placing frame part 30 of lower hemp picking element 25 into the transverse lifting arm 47c of the lifting unit from above or, conversely, by simply pressing transverse lifting arm 47c against frame part 30 from below. Finally, the whole is locked by a locking mechanism 70 (FIG. 3), for instance in the form of a remotely controllable extending cylinder which in extended state ensures that processing unit 3 remains locked to the lifting unit. The lifting unit is then ready to lift processing unit 3.

As shown with arrows ($P_1$) in the figures, the length of lifting cylinders 36 is controllable. It will be apparent that when the length of lifting cylinders 36 is increased, frame part 30 will pivot upward, while frame part 30 will pivot downward if the length of lifting cylinders 36 is reduced. In this way the height of the free end of the processing unit can be varied, for instance in order to adjust the position in which the processing unit grips the fibre plants and pulls them from the ground during travel of the vehicle.

The mounting means of each of the different processing units 3 are essentially identical. This means that the different processing units can not only be easily mounted on and detached from the vehicle, but that this can also take place in a uniform manner. It is noted here that when processing units 3 are exchanged, only the mounting means of processing unit 3 (i.e. the second mounting means 32 when the processing unit is a picking unit for long fibre plants, third mounting means when the processing unit is a picking unit for short fibre plants and fourth mounting means when the processing unit is a turning unit for turning long or short fibre plants) need in fact be released from the first mounting means of the vehicle, after which processing unit 3, particularly the frame part 30 thereof, can be removed from the upper side of cylinder 36. By now simply pacing another processing unit 3 on the lifting unit of vehicle 2 and mounting the associated mounting means on the first mounting means of the vehicle, the user can easily make processing machine 1 suitable for the specific desired process, such as picking of short fibre plants, picking of long fibre plants or picking up and turning fibre plants.

As described above, FIGS. 4, 5, 8, 9A and 9B comprise an embodiment of a processing machine 1 according to the invention wherein the processing machine is provided with an exchangeable picking unit comprising a first picking element and a second picking element placed thereabove.

The embodiment is embodied for picking of relatively long fibre plants, such as hemp plants, as shown schematically in the figure.

Figure 9A:
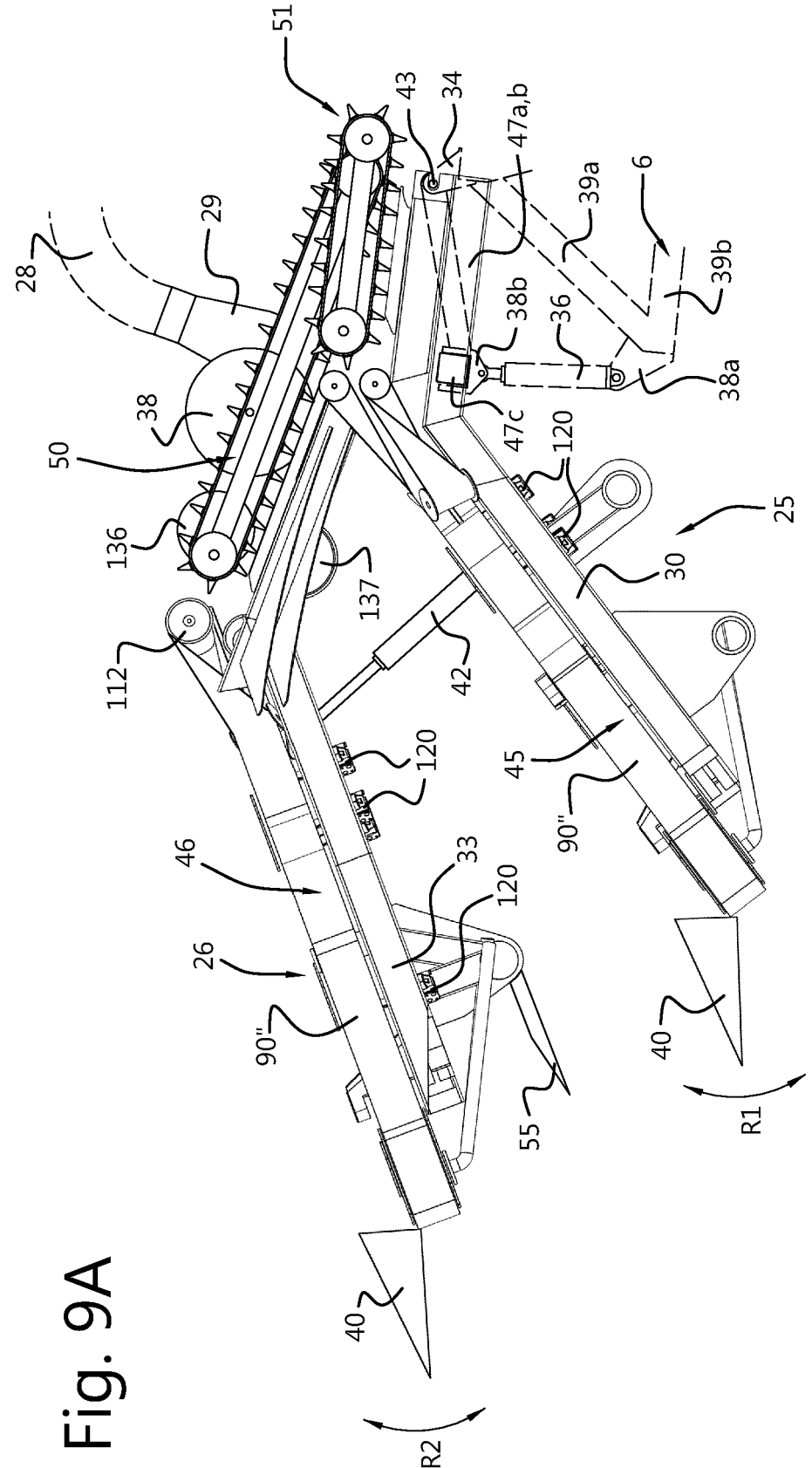
FIG. 9A is a side view of the embodiment of FIG. 5 with the lower processing element in a first pivot position.
Figure 9B:
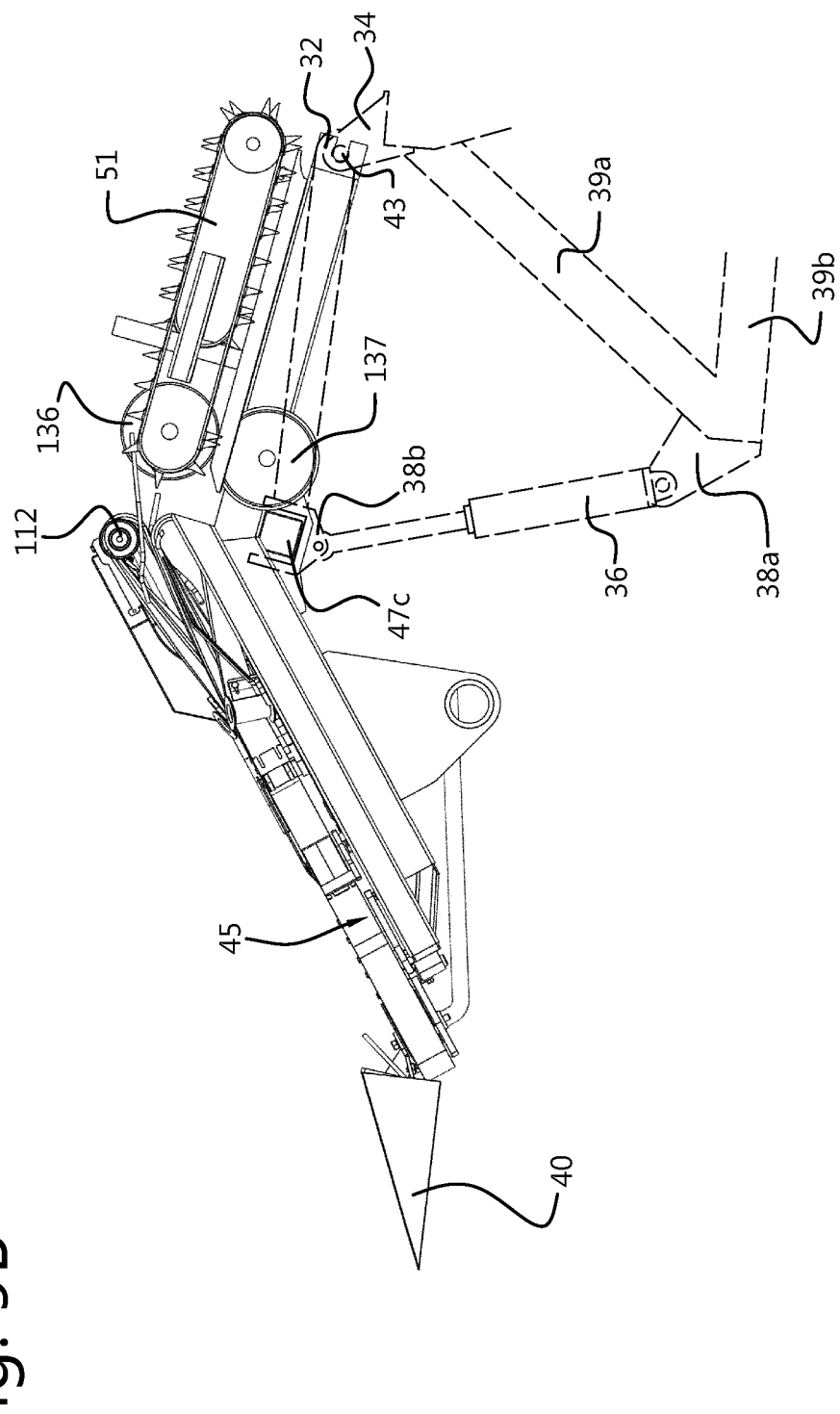
FIG. 9B is a side view of a part of the embodiment of FIG. 5 with the lower processing element in a second pivot position.

In the shown embodiment the processing machine 1 comprises the above stated self-propelling vehicle 2 and a specific processing unit 3, i.e. a hemp picking unit. The hemp picking unit comprises a lower hemp picking element 25 and arranged thereabove an upper hemp picking element 26. The lower picking element 25 is mounted on the first mounting means of the vehicle in the above stated manner, this such that the first hemp picking element 25 can be pivoted in upward and downward directions (pivoting directions $R_1$, FIG. 9A) by controlling said lifting cylinders 36 (FIGS. 9A and 9B). The upper hemp picking element 26 is pivotally arranged via pivot shafts 43 on the lower hemp picking element 25 so that the upper hemp picking element 26 can be pivoted (pivoting directions $R_2$) relative to the first hemp picking element 25 (and relative to vehicle 2 and the ground surface). The pivoting movement of the upper hemp picking element 26 relative to the lower hemp picking element 25 is driven by a number of further lifting cylinders 42 arranged on frame parts 30, 33 (FIG. 9A), wherein increasing the length of lifting cylinders 42 results in an upward rotation of the upper hemp picking element 26 relative to the lower hemp picking element 25, while reducing the length results in a downward rotation of the upper hemp picking element 26 relative to the lower hemp picking element 25.

Figure 4:
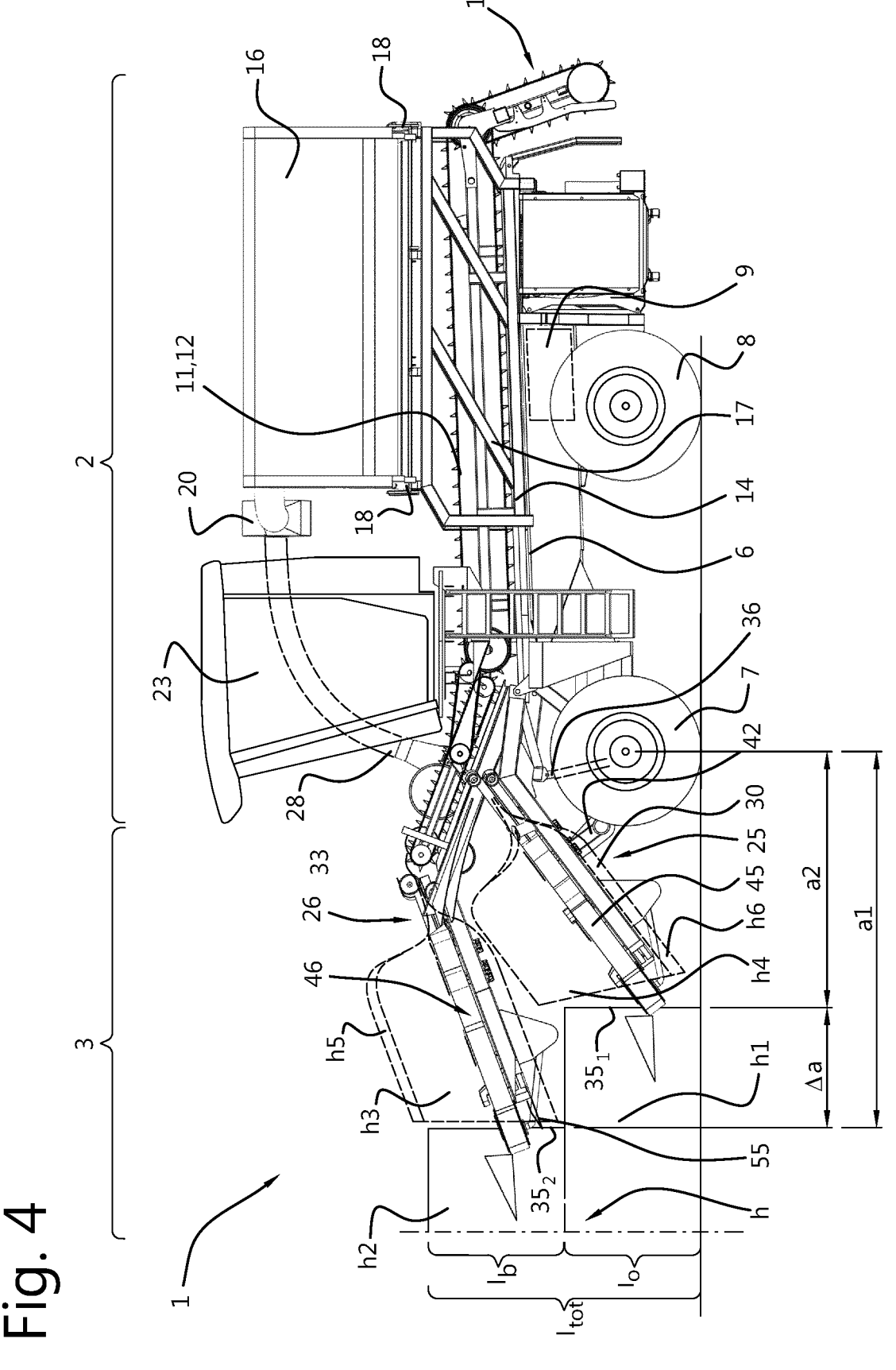
FIG. 4 is a side view of a hemp machine according to an embodiment of the invention, wherein a processing unit 3 is mounted on vehicle 1 and is suitable for processing of long fibre plants.

FIG. 4 shows schematically that the relatively long fibre plants (h), such as hemp, kenaf or similar fibre plants, have an overall length $l_{tot}$ (characteristically between 1.4 and 4.0 metres, 2.4 metres on average). The lower part ($h_1$) of each of the fibre plants (h) has a length $l_o$ (for instance 110 cm to 120 cm), while the upper part ($h_2$) has a length $l_b$ (for instance 120 to 130 cm). In the shown embodiment both lengths $l_o$ and $l_b$ are roughly the same, although in practice these lengths may of course differ. What is important is only that the fibre plants (h) are cut into at least two parts ($h_1$, $h_2$) and then processed further by processing machine 1. Said lower hemp picking element 25 is for this purpose made suitable for picking and processing the lower fibre plant parts ($h_1$), while the upper hemp picking element 26 is intended for picking the upper fibre plant parts ($h_2$).

The upper hemp picking element 26 comprises a transport installation 46 for gripping hemp plants and transporting them to vehicle 2, while the lower hemp picking element 25 comprises a (preferably wholly or almost wholly identical) transport installation 45 whereby hemp plants can likewise be gripped and transported to vehicle 2. When vehicle 2 travels in a forward direction ($P_{A,v}$), the upper hemp picking element 26 will reach the hemp plants first. After a short time interval the lower hemp picking element 25 will also reach these same hemp plants. In other words, the engaging position at which the upper hemp picking element 26 engages a determined hemp plant at a determined point in time is shifted relative to the engaging position at which the lower hemp picking element 25 engages a (different) fibre plant at the same point in time. This has the result that the upper hemp picking element 26 first engages the upper part ($h_2$) of the hemp plants and cuts them loose from the lower part ($h_1$) with a cutting unit 55 (also referred to here as mowing unit 55) provided on the front side of the upper hemp picking element 26, while it is after this, so only when upper part $h_2$ has been cut loose and is already being carried away, that the lower hemp picking element 25 will engage on the lower part ($h_1$) of the same hemp plant.

The lower hemp picking element 25 is configured to engage the lower part ($h_1$) of the hemp plant. As a result of the forward movement of vehicle 2 and/or as a result of displacement by means of the transport installation 45 to be described further below the hemp plants are pulled from the ground along with the roots. It is therefore noted that the lower part of a hemp plant is in principle not cut loose from the roots before the hemp plant has been pulled from the ground as a whole.

As shown in FIG. 4, the gripped upper part ($h_2$) of a hemp plant (h) which has been cut loose with mowing unit 55 is picked up by the upper hemp picking element 26. This upper part ($h_2$) of the fibre plant comprises a top, flower or plume portion ($h_5$) and a remaining upper portion ($h_3$). As will be elucidated below, in determined embodiments the top portion ($h_5$) of the upper part ($h_2$) of the hemp plant (h) will be removed using a cutting unit. The top portion ($h_5$) is here discharged via discharge means comprising a discharge pipe 28 with an inlet opening close to the cutting unit, a centrifugal fan 20 connected to the discharge pipe and an outlet opening to a receptacle 16 arranged via a frame 17 on the rear side of vehicle 2. As shown in FIG. 4, this receptacle 16 is releasably mounted via rapid couplings 18 on a frame part of frame 6 and will essentially only be used when the intention is to remove the top portions ($h_5$) from a fibre plant. In other words, when the top portion is not cut off, receptacle 16 can optionally be dispensed with.

The lower part ($h_1$) of a hemp plant (h) is similarly composed of a root portion $h_6$ where the roots of the hemp plant are located and a remaining lower part $h_4$. In determined embodiments the root portion $h_6$ will be removed from the lower part $h_1$ of the hemp plants (h) by means of a root cutting unit to be further described below (for instance the root cutting unit of FIG. 14 to be described below). These removed root parts $h_6$ can be discharged to the receptacle 16 on the vehicle, although they are preferably dropped (in a manner which is not further described) directly onto the ground (o). In a determined embodiment the cutting unit and the associated discharge means of the root portions ($h_6$) are embodied such that these portions come to lie directly in front of one or more of the wheels 7, 8. This has the result that when vehicle 2 advances, the cut-off root portions $h_6$ are compressed or even pressed into the ground under the weight of the tyres of wheels 7, 8. In other words, in this embodiment the roots are pressed into the ground and the tops are collected in receptacle 16, which has the result that the delivering units 13 place only the lower remaining parts ($h_4$) and the upper remaining parts ($h_3$) of a hemp plant (h) onto the ground (o) on the rear side of the vehicle. As further elucidated elsewhere, in determined embodiments the two delivering units 13 are configured to place a first row 15a of only lower remaining parts ($h_4$) of the hemp plant and a second row 15b of only upper remaining parts ($h_3$) of the hemp plants (h) onto the ground and then have them undergo the desired retting process (FIG. 2).

Figure 5:
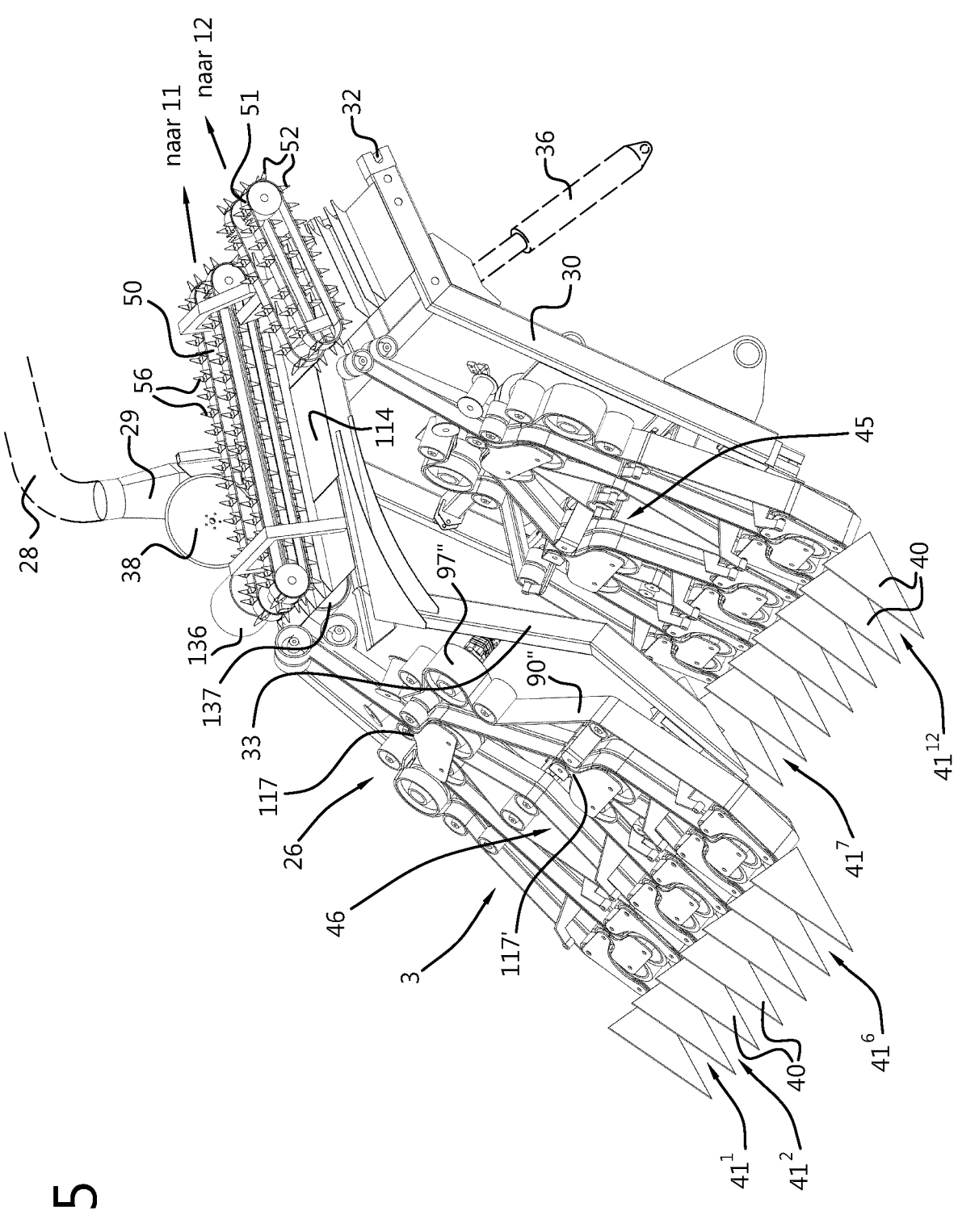
FIG. 5 is a detail view of an embodiment of a processing unit 3 according to the invention.
Figure 7:
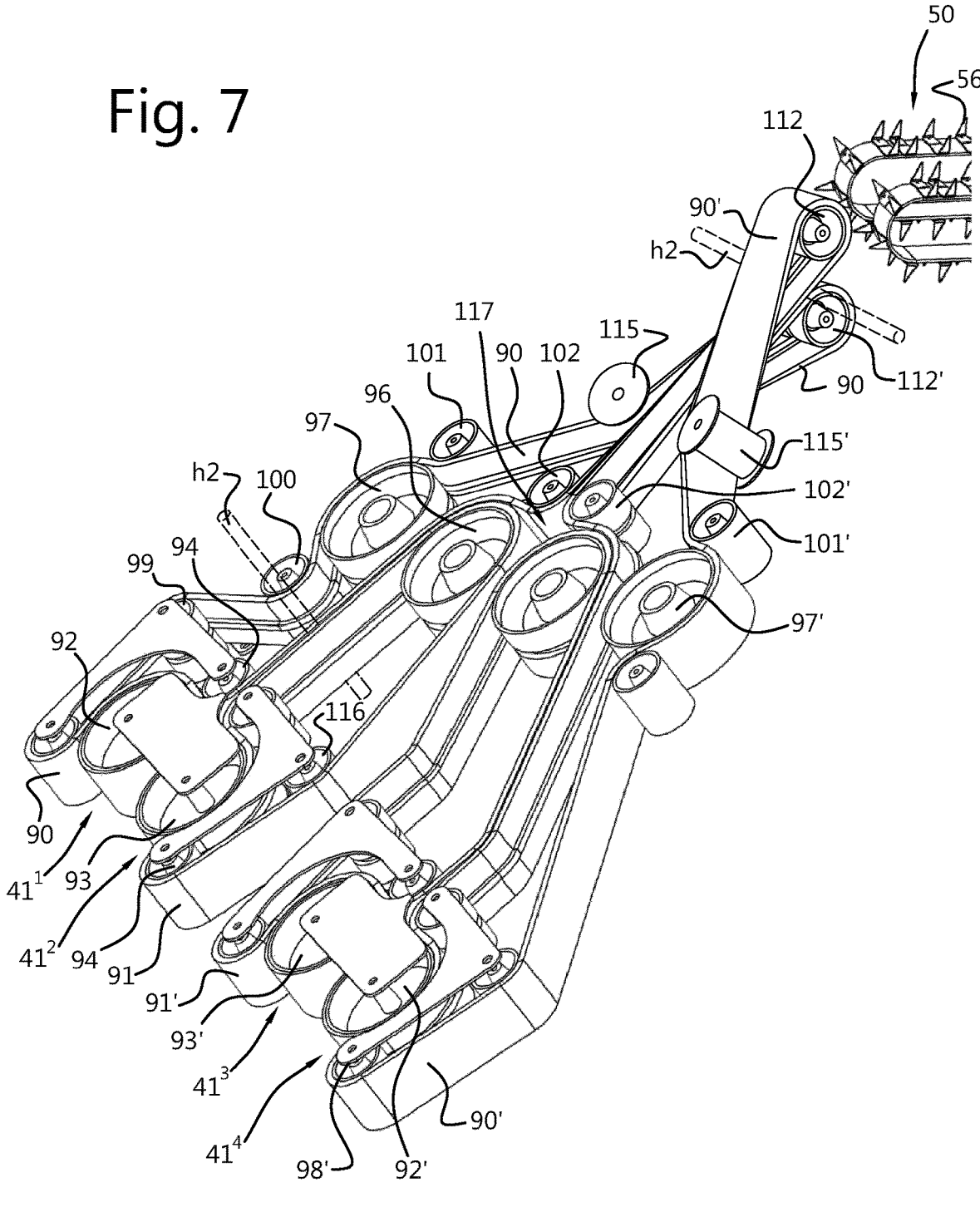
FIG. 7 is a perspective side view of the embodiment of FIG. 6.

FIG. 5 shows a view of hemp picking unit 3, while FIG. 7 shows a part of the upper picking element 26 of hemp picking unit 3 in more detail. Both figures show the transport installations 45, 46 whereby the hemp plants are gripped and transported to vehicle 2. Each of the transport installations 45, 46 comprises a number of endless belt conveyors, more particularly a first number of endless belt conveyors for gripping the crop, transporting it and tilting the crop during transport, and a second number of endless belt conveyors for receiving the crop from the first number of belt conveyors and transporting the crop to the conveyors on vehicle 2. The second number of conveyors (characteristically 3, 4 or more) is here usually smaller than the first number of conveyors (characteristically 1 or 2).

Guide elements 40 are provided on the front side of both the lower hemp picking element 25 and the upper hemp picking element 26. Their object is to make it possible to be able, when the vehicle and the picking unit 3 mounted thereon are advanced, to push the hemp plants (h) to the side and guide them into a number of, in FIG. 5 six per hemp picking unit (although this can also be a greater or smaller number in other embodiments), passages $41^1$-$41^6$ for the upper hemp picking element 26 and passages $41^7$-$41^{12}$ for the lower hemp picking element 25, all configured to receive and grip the hemp plants. These twelve passages are formed by a number of driven conveyor belts and a number of pulleys.

Figure 6:
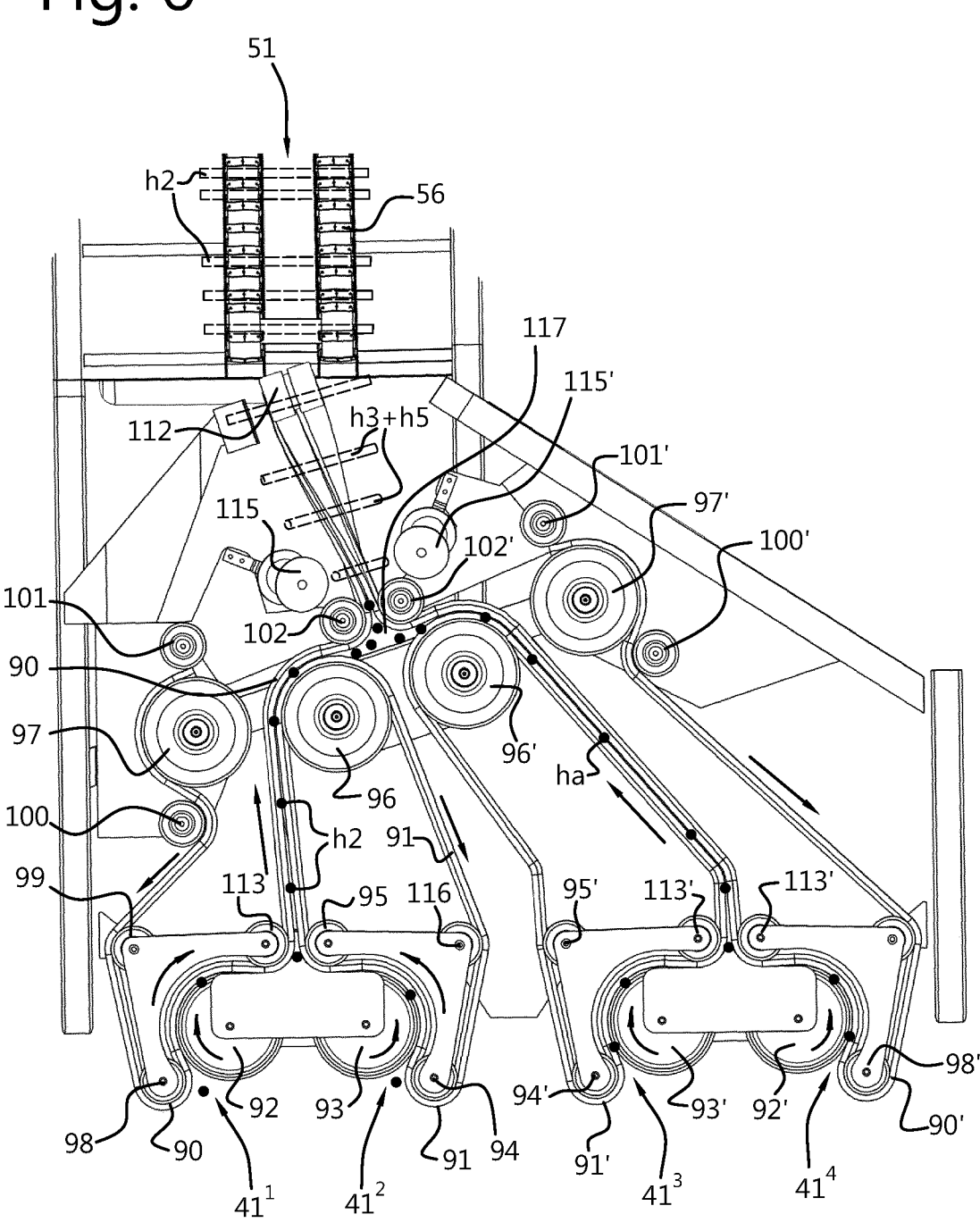
FIG. 6 is a top view of an alternative embodiment of a processing unit according to the invention.

Referring to FIGS. 6 and 7 (showing an alternative embodiment having only two passages. The operation of the embodiment shown for instance in FIG. 5 is substantially the same), a first passage $41^1$ is shown which is formed by the intermediate space between a first driven conveyor belt 90 and roller 92. A second passage $41^2$ is formed by a second driven conveyor belt 91 and roller 93. Likewise, the third passage $41^3$ and fourth passage $41^4$ are formed by respectively conveyor belt 91' and roller 93', and conveyor belt 90' and roller 92'.

When hemp plants (h, shown in FIG. 6 with black dots in as far as the hemp plants are in upright position and shown with broken lines as soon as the hemp plants have been rotated to the lying position) have found their way into the first passage $41^1$ formed between the first driven conveyor belt 90 and roller 92, they are pulled along in the direction indicated by the arrow. Along the first section the hemp plants which have found their way into passage $41^1$ are enclosed between the first conveyor belt and the roller 92 and transported thereby, further on the hemp plants come to lie between first conveyor belt 90 and second conveyor belt 91. The second conveyor belt 91 is a relatively short conveyor belt and extends in upward direction over its whole length. The second conveyor belt 91 is trained around said roller 93, a number of further rollers 94, 95 and 116 and a driven pulley or roller 96. The third conveyor belt 91' of the third passage $41^3$ has essentially the same construction as the second conveyor belt 91, except in mirror image and driven by a drive pulley or drive roller 96'.

The first conveyor belt 90 is a lot longer than the second conveyor belt 91 and extends over a part of its length in upright state, but along a different part of its length the position of the conveyor belt is rotated from the upright position to a lying position, and further along from a lying position back to an upright position. The first conveyor belt 90 is trained around said roller 92 and a number of further rollers 113, 96 (via second conveyor belt 91), 102, 112, 115, 101, 97 (roller 97 is driven), 100, 99 and 98 (as seen in transport direction). The fourth conveyor belt 90' of the fourth passage $41^4$ has essentially the same construction as first conveyor belt 90, except in mirror image and driven by a drive pulley or drive roller 97' and trained over rollers 92', 113', 96' (via third conveyor belt 91'), 102', 112', 115', 101', (driven) 97', 100', 99' and 98'. The driven rollers or pulleys 97, 96, 96' and 97' (and in the embodiment of FIG. 5 the rollers or pulleys of the fifth and sixth conveyor belts 91" and 90" as well) are each driven individually by their own motor, preferably their own hydraulic motor 120 or electric motor (for instance a DC electric motor).

The figures show embodiments of the transport installations 45, 46 in which different endless belt conveyors are used for temporarily supplying a number of hemp plant streams. Parts of endless belt conveyors are here preferably used in combination in order to thus achieve an efficient use of the space available on the picking elements and/or to limit the complexity and thereby the costs of the transport installations. It is for instance shown in the drawings that a converging area 117 (FIG. 6), wherein two (or more) streams of hemp plants converge, is defined roughly halfway between the entry of the hemp plants on the front side of each of the transport installations 45, 46 and the delivery of the plants on the rear side of transport installations 45, 46 to vehicle 2.

Referring to FIGS. 6 and 7, which show an example of an upper hemp picking element 26, transport installation 45, 46 grip in each case the upper parts ($h_2$) of the hemp plants (h) via each of the passages 41 and process them further. The upper parts ($h_2$) of the hemp plants are pulled inward into said passages. In the drawings a small number of fibre plants (h) is shown with black dots, although in practice this number will of course be much greater and a substantially continuous row of fibre plants will be transported between the endless conveyor belts 90, 91 and 90', 91'. As stated above, the cut-off fibre plants ($h_2$) extend in upward (vertical) direction in the first part of each of the passages, and further along in transport installation 45, 46 the cut-off hemp plants ($h_2$) are rotated through a quarter turn to a lying (substantially horizontal) position (fibre plant parts $h_2$ then being shown in broken lines). Once in this lying position, the fibre plants are transferred from an endless belt conveyor to a further endless belt conveyor (i.e. conveyor 50 of the upper hemp picking element 26 and conveyor 51 of the lower hemp picking element 25).

Figure 8:
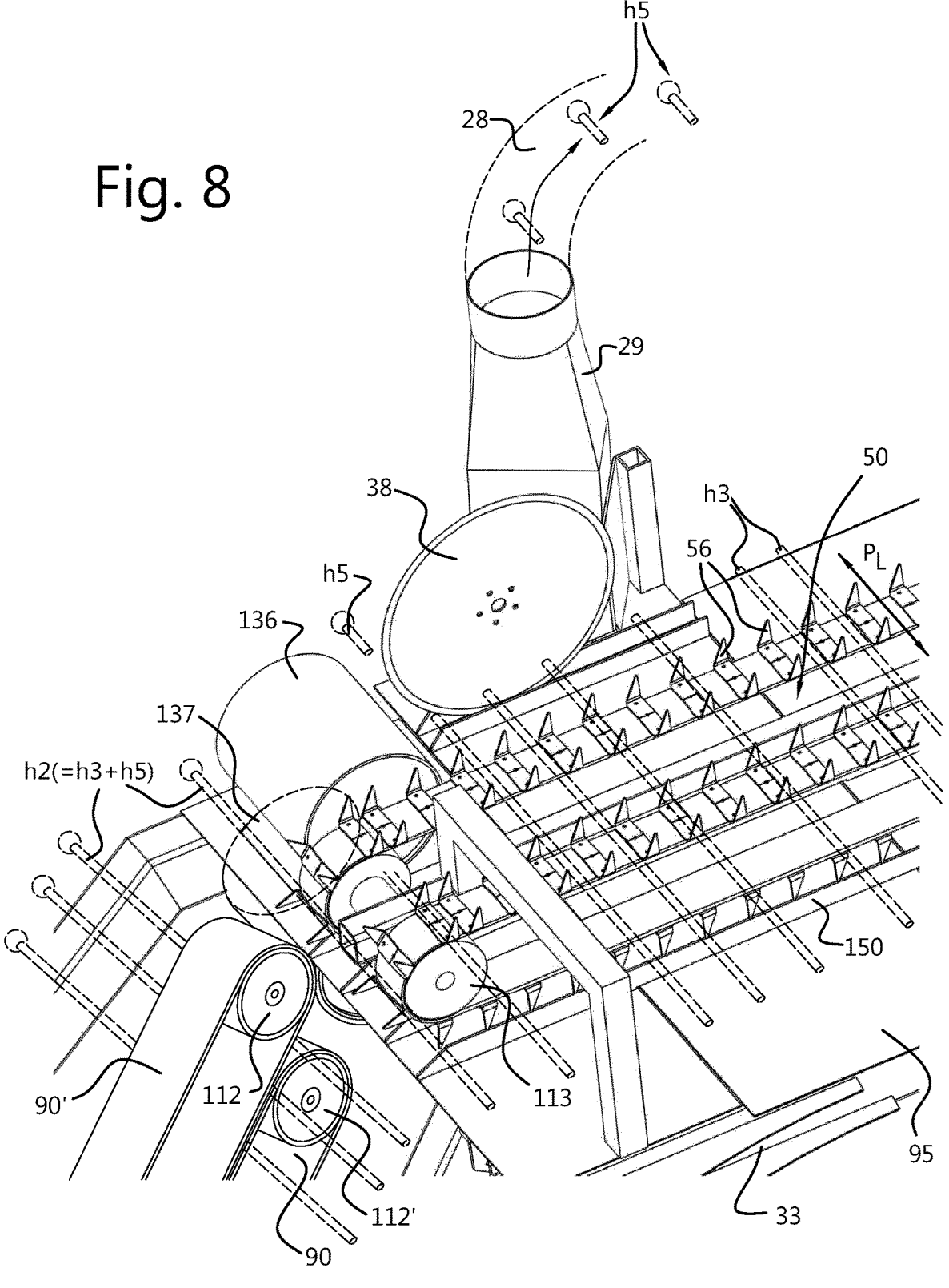
FIG. 8 is a perspective detail view of the embodiment of the processing unit according to FIGS. 5-8.

Referring to FIG. 8, each of the conveyors 50, 51 is constructed in known manner from two mutually adjacent endless conveyor belts which run on rollers in likewise known manner and are advanced via a drive (not shown). The hemp plant parts ($h_2$) are transported further toward vehicle 2 by carriers 56 provided on the endless conveyor belt of conveyor 51, 52 (FIG. 8). Carriers 56 ensure that no hemp plants remain behind and that carried along hemp plants come to lie neatly parallel to each other, perpendicularly of the longitudinal direction (i.e. the axial direction) of machine 1.

FIGS. 5-7 show the operation of transport installation 45 and particularly the turning over of the hemp plants in more detail. The two streams of hemp plants which enter via passages $41^1$ and $41^2$ converge between conveyor belts 90 and 91. The hemp plants ($h_2$) are then transported on between conveyor belts 90, 91 and, after having passed the driven pulley or roller 96, reach said collecting area 117. In the embodiment of FIGS. 6 and 7 the streams from passages $41^1$/$41^2$ and $41^3$/$41^4$ converge in this collecting area 117. FIG. 5 shows an embodiment where the combined streams of passages $41^1$ and $41^2$ on one side and the combined streams of a number of other passages on the other converge in collecting area 117. In the embodiment shown in FIG. 6 these are passages $41^3$ and $41^4$, but in the embodiment of FIG. 7 they are the streams from passages $41^3$, $41^4$, $41^5$ and $41^6$ which in turn have already converged previously in a collecting area 117'.

As shown particularly in FIG. 7 (but also in FIGS. 5 and 6), both conveyor belt 90 of the first and second passages $41^1$ and $41^2$ and the conveyor belt 90' of the third and fourth passages $41^3$-$41^4$ (or third to sixth passages in the embodiment of FIG. 5) are tilted after passing both rollers 102, 102' in that the respective belts 90, 90' are trained over rollers 112 having a rotation axis which lies perpendicularly of the rotation axis of rollers 102, 102'.

As shown on the right-hand side of FIG. 7, the hemp plants (i.e. the upper parts $h_2$ cut off by mowing unit 55, so consisting of the top parts $h_5$ which have not yet been cut off at that point and the remaining upper parts $h_3$) will be supplied and transported between the conveyor belts in upright position. At a certain point their position changes in that they come to lie between conveyor belts 90 and 90'. At the position of horizontal rollers 112, 112' the hemp plants are released and are received by the further conveyor 50 and transported on. This is shown in more detail in FIG. 8.

The horizontally oriented hemp plant parts ($h_2=h_3+h_5$) reaches the endless belt conveyor 50. The cut-off hemp plants ($h_2$) are enclosed between the underside of the endless belt conveyor 50 and the upper side of a number of upright guide flanges 150 on frame part 33 and transported toward vehicle 2. During this transport the hemp plants ($h_2$) are processed by pressing (rolling) them and by cutting the top portions ($h_5$) off the pressed hemp plants ($h_2$) and discharging them.

The lying hemp plants ($h_2$) are first guided between an upper pressing roller 136 and lower pressing roller 137 so that at least the relevant tops ($h_5$) (these often taking the form of a plume) are pressed. These pressed top portions ($h_5$) of the hemp plants ($h_2$) are then cut off via a top cutting unit 38. This top cutting unit 38 is represented in highly schematic manner in FIG. 8 as a vertically arranged rotatable circular knife 38. The housing around this circular knife 38, the drive of the rotation of circular knife 38 and guide means for displacing circular knife 38 in lateral direction $P_L$ are not shown. The lateral displacement of the cutting unit is driven by an actuator, for instance a hydraulic motor or an electric motor. The cut-off top parts ($h_5$) of the hemp parts are extracted via the extraction means 29, for instance a collecting mouth 29, connected to an extraction pipe 28 and a centrifugal fan 20, and blown into the receptacle 16 on the rear side of vehicle 2 for storing the top parts therein.

The picking and further processing of the upper parts ($h_2$) by means of the upper picking unit 26 is described in detail with reference to FIGS. 5-8. The lower parts ($h_1$) of the hemp plants (h) are similarly picked and further processed by the lower hemp picking element 25. A detailed description of the way in which these lower parts ($h_1$) of the hemp plants are gripped and processed can therefore be dispensed with. The lower hemp parts ($h_1$) are gripped and carried along in similar manner by a transport installation 45, rotated through a half turn until they are in horizontal position and then discharged by a conveyor 51.

FIG. 9A otherwise shows a situation in which the lower hemp picking element 25 is in the lowest pivot position. In other words, lifting cylinder 36 is in the wholly retracted state. FIG. 9B, which shows only the lower hemp picking element 25 and wherein the upper hemp picking element 26 is not shown for the sake of convenience, shows a situation in which the lower hemp picking element 25 is pivoted upward to some extent. In other words, lifting cylinder 36 has become longer. In this way the pivot position of the lower hemp picking element 25 can be set as desired, for instance depending on the soil condition (if the soil is level the hemp picking element 25 can be placed closer to the soil/ground than if the soil is uneven). Similarly, the position of the upper hemp picking element 26 can be set as desired with lifting cylinders 42. In the shown embodiment the position of the upper hemp picking element 26 can be set essentially independently of the position of the lower hemp picking element 25. The pivot position of the upper hemp picking element 26, and thereby the height at which the front part of guides 40 and/or the mowing unit 55 extend above the ground, can be set depending on the height of the crop to be harvested. In the case of relatively high hemp plants (for instance more than 3 m long) the upper hemp picking element 26 will generally be pivoted further upward, while the hemp picking element 26 is placed further downward in the case of shorter hemp plants (<3 m). It is important here that the crop is cut at a correct height (i.e. height $l_o$ in FIG. 4) in order to realize an upper part ($h_2$) and a lower part ($h_1$) of the crop with different dimensions. It is noted here that the pivot position of the processing unit, more particularly the pivot position of at least one of the upper and lower picking element, can be adjusted continuously (optionally during travel) in order to ensure that, if there are height variations in the ground surface, these can be followed so that there is essentially no effect on the swathe.

In the above stated embodiments the processing machine 1 is geared toward processing relatively high/long crops, such as hemp. In other embodiments processing machine 1 can be made suitable in very simple manner for processing shorter/less high crops, such as flax. For this purpose hemp picking unit 3 consisting of at least the upper and lower hemp picking elements 25, 26 is replaced with a flax picking element 129 which is embodied specifically to process this lower crop. The height of the crop, such as flax, is usually between 80 cm and 120 cm ($l_{tot}$=80-120 cm).

FIG. 11 shows a further embodiment of a processing unit 113 for picking relatively long fibre plants, such as hemp. Processing unit 113 has a pivotable upper picking element 123 and a pivotable lower picking element 125. The lower picking element 125 comprises a frame 140 and the upper picking element 123 has a frame 148. The frame 140 of the lower picking element 125 has a first frame part 140a which can be mounted pivotally on vehicle chassis 6 in the known, above described manner using the third mounting means (in FIG. 11 also denoted by the reference number of the second mounting means, i.e. reference number 32). This first frame part 140a can be pivoted in upward and downward direction using the above described lifting unit comprising a number of lifting cylinders 36. Formed integrally on frame part 140a is a second frame part 140b. Second frame part 140b lies here at an angle (characteristically of about 45 degrees) relative to first frame part 140a. A third frame part 140c is further formed between the first and second frame parts 140a, 140b. This third frame part 140c functions as support for the first and second frame parts and ensures that the two frame parts keep extending at said angle under heavy load as well. Second frame part 140b further comprises a number of support flanges 141 on which a number of lifting cylinders 142 are mounted. Lifting cylinders 142 are pivotally coupled with their outer ends via respective hinges 144 and 145 to the second frame part 140b of the frame 140 of lower picking element 125 and to the frame 148 of upper picking element 123. By increasing or reducing the length of lifting cylinders 142 (see arrows) the upper picking element 123 can be pivoted respectively upward and downward.

FIG. 11 also shows an embodiment of the above stated root cutting unit 160 and the cutting unit or mowing unit 55 on the front side of the upper picking element 123. The root cutting unit 160 shown in FIG. 11 is shown in more detail in FIG. 14. The root cutting unit 160 is positioned on the underside of lower picking element 125 in order to cut the root portions ($h_6$) off the flax plants (h) pulled from the ground and transported therealong by the endless belt conveyor 90. Root cutting unit 160 comprises two supports 160, 160', mutually connected with a support arm 166, wherein a lying (horizontal) cutting part 164 is arranged between the two supports 160, 160'. Cutting part 164 is provided with two circular knives 168, 168' which can be rotated via respective root cutting unit drive motors 169, 169'. In this embodiment the root portions cut off by the rotating circular knives 168, 168' drop directly downward and end up on the ground. In other embodiments (not shown) a provision is also made to have the cut-off root portions drop to the ground at a specific lateral position, for instance at one or more lateral positions directly in front of at least one of the two front wheels 7. It is further shown that the height of cutting part 164 can be adjusted relative to the rest of the first picking element by controlling an actuator 165, for instance an electric motor or a hydraulic lifting cylinder, which drives the rod system 167 on which the cutting part 164 is mounted. A single actuator can be provided, for instance mounted on support 160 or support 160', although in other embodiments an actuator is provided at both outer ends of cutting part 164. The rods of rod system 167 are mounted rotatably on the support 160, 160', this such that by pushing against or pulling on the upright rod of the rod system the rods are set into rotation and in this way move cutting part 164 respectively upward and downward.

FIG. 11, and in more detail FIG. 13, also show the cutting or mowing unit 55 already described above with reference to FIG. 4. The cutting unit 55 in FIG. 4 was mounted on the underside of the frame 33 of the upper picking element 26, while the cutting unit of FIG. 15 is arranged on the underside of frame part 148 of the upper picking element 123. The embodiment and operation of cutting unit 55 is however the same in both embodiments.

Cutting unit 55 comprises two support cheeks 57, 57' provided on the underside of frame part 148. Respective L-shaped supports 58 are mounted rotatably (via rotation shafts) on the two support cheeks 57, 57'. The rotation movement of the two L-shaped supports 58 is realized by an actuator 59, for instance an electric motor 58 mounted on the relevant support cheek 57, 57'. Rotation of the L-shaped supports 58 provides for upward or downward movement of an elongate cutting element 60. The height of the cutting unit relative to the rest of the picking element and thereby the height of the cutting unit relative to the ground surface can hereby be adjusted as desired.

The actuator is preferably remotely controllable, for instance from the driver's cab 23 (FIG. 4), so that the height of the cutting unit relative to the rest of the picking element can be adjusted remotely, for instance during travel of the vehicle or just before a quantity of fibre plants of a determined length will be picked.

In the shown embodiments the elongate cutting element 60 is constructed from a (horizontal) row of mutually reciprocally displaceable blades 69 in which a large amount of fibre plants can be cut, this row extending over a substantial or substantially whole width of the upper picking element. The reciprocal displacement of the blades of such a cutting unit is driven by a motor 61, for instance an electric motor and a suitable transmission mechanism.

Because the processing machine is in determined embodiments of the invention able to adjust the position/orientation of the processing unit 3 (more particularly adjust the pivot position of the flax picking element of the flax picking unit, the pivot positions of both the upper picking element and the lower picking element of the hemp picking unit, the pivot position of the pick-up unit, the height of cutting unit/mowing unit 55, the position (height) of root cutting unit 160 and/or the (lateral) position of top cutting unit 38) and because this position adjustment (in height direction and lateral direction) further preferably takes place during travel and processing of the fibre plants, it is possible to optimally anticipate the local conditions in the field, for instance a varying height of the fibre plants, a varying orientation of the ground surface, and the like. This varying of the height and/or lateral cutting position can be controlled manually via suitable operating elements in driver's cab 23. In further embodiments this is however done by means of an electronic control unit, for instance a computer. This can be connected to one or more sensors, such as a camera, whereby the height (and/or other parameters) of the fibre plants can for instance be measured. The electronic control unit can then (before the fibre plants are processed or during processing thereof, so while travelling) control one or more of the processing unit (i.e. one or more of the flax picking element, upper picking element, lower picking element and pick-up unit), the root cutting unit and the top cutting unit on the basis of the measurement signals of the one or more sensors and on the basis of a predetermined control algorithm. The adjusting can take place dynamically, which means that the control is performed continuously or periodically with a short time interval, so as to thus always have the processing machine in an optimal position during travel. An additional advantage is that, even when the height of the fibre plants varies, the control unit controls at least one of the flax picking element, the upper picking element, the lower picking element, the pick-up unit, the root cutting unit and/or the top cutting unit such that the swathes on the rear side of the vehicle come to lie neatly aligned behind the vehicle relative to the centre line. More particularly, the control unit can be configured to match the centre lines of the two swathes to the centre line of the picking element and to control the cutting units and/or the picking units on the basis thereof.

The present invention is not limited to the embodiments described herein. The rights sought are defined by the following claims, within the scope of which numerous modifications can be envisaged.

The invention claimed is:

1. A hemp picking machine for picking and processing hemp plants, the hemp picking machine comprising:
   a self-propelling vehicle comprising a vehicle chassis with at least a conveyor configured to transport picked and processed hemp plants in at least two streams from a first end to an opposite second end, and at least a delivering system provided at or close to the second end to receive the respective streams of picked, processed and transported hemp plants and then place the received hemp plants on the ground in at least two rows; and
   a hemp picking system mounted or mountable on the vehicle chassis and configured to pick the hemp plants, the hemp picking system comprising:
   a lower picking element configured to pick the lower part of the hemp plants, and
   an upper picking element configured to pick the upper part of the hemp plants,
   wherein the lower picking element has a first transport installation configured to grip the part of the hemp plants that is the lower part relative to the ground surface, pull the gripped hemp plants from the ground along with the roots, and transport the lower parts of the hemp plants to the conveyor of the vehicle,
   wherein the upper picking element has a cutter configured to cut the hemp plants at a position between the upper and lower part of the hemp plants, the cutter comprising elongate cutting element, the cutter being mounted rotatably on the upper picking element to provide for upward of downward movement of the elongate cutting element, upper picking element having a second transport installation configured to grip the part of the hemp plants being the upper part relative to the ground and to transport the upper parts of the hemp plants to the conveyor of the vehicle, the cutter being configured to cut the hemp plants during transport.

2. The hemp picking machine according to claim 1, wherein the lower picking element and the upper picking element are disposed relative to each other such that during travel of the vehicle the upper picking element first grips and cuts loose the upper parts of the hemp plants and only then does the lower picking element grip the lower parts of the hemp plants.

3. The hemp picking machine according to claim 1, wherein the engaging position of the second transport installation on the hemp plants is situated at a greater distance from the first end of the vehicle than the engaging position of the first transport installation, wherein the difference between a first distance of the first end of the vehicle to the engaging position of the second transport installation and a second distance of the first end of the vehicle to the engaging position of the first transport installation may be at least 10 cm.

4. The hemp picking machine according to claim 1, wherein the conveyor of the vehicle is configured to receive the upper parts and lower parts of the picked hemp plants separately and to deliver the received and transported upper parts and lower parts of the picked hemp plants separately.

5. The hemp picking machine according to claim 1, wherein the conveyor of the vehicle comprises:

a first conveyor configured to receive the upper parts of the hemp plants from the upper picking element, and a second conveyor, substantially parallel to the first conveyor and configured to receive the lower parts of the hemp plants from the lower picking element.

6. The hemp picking machine according to claim 1, wherein the transport installations are configured to rotate the hemp plants during transport, particularly to rotate the hemp plants from a substantially upright position to a substantially lying position.

7. The hemp picking machine according to claim 1, wherein the cutter comprises at least a displaceable support which is disposed on the upper picking element or is formed integrally therewith, and wherein the displaceable support comprises a remotely controllable actuator configured to remotely control the adjustment of the height of the cutting unit relative to the rest of the upper picking element.

8. The hemp picking machine according to claim 1, further comprising a root cutter configured to cut a root part off the lower parts of the hemp plants.

9. The hemp picking machine according to claim 1, further comprising a top cutter configured to cut a top part off the upper parts of the hemp plants.

10. The hemp picking machine according to claim 9, further comprising a first discharge system configured to discharge the cut-off top parts from the top cutter to a collector on the self-propelling vehicle.

11. The hemp picking machine according to claim 1, further comprising a first lifting system disposed between the vehicle chassis and the lower picking element set the pivot position of the lower picking element relative to the vehicle chassis.

12. The hemp picking machine according to claim 1, wherein the transport installations each comprise at least one pair of endless conveyor belts which are trained over pulleys and are configured to grip the hemp plants therebetween and transport the hemp plants in gripped state.

13. The hemp picking machine according to claim 1, wherein the upper picking element is disposed pivotally on the lower picking element.

14. The hemp picking machine according to claim 1, further comprising a compacting system configured to compact the hemp plant parts transported by the upper picking element.

15. The hemp picking machine according to claim 1, further comprising a collector configured to collect and store cut-off parts of picked hemp plants therein.

16. The hemp picking machine according to claim 1, wherein the cutter comprises at least one displaceable L-shaped support, wherein the at least one displaceable L-shaped support is mounted rotatably via at least one respective support provided on the underside of a frame part of the upper picking element.

17. A method for picking and processing hemp plants with a hemp picking machine, the method comprising:

driving the hemp picking machine over a ground surface, and, while travelling over the ground surface:

gripping hemp plants rooted in the ground with an upper picking element, rotating a cutter mounted rotatably on the upper picking element to provide for upward or downward movement of an elongate cutting element comprised in the cutter, cutting the upper parts of the hemp plants loose from the lower parts using the elongate cutting element of the cutter, gripping the remaining lower parts of the hemp plants which are rooted in the ground and from which the upper parts have been cut loose using a lower picking element after the upper parts have been cut loose, pulling the lower parts from the ground along with the roots using the lower picking element, transporting the upper parts and lower parts of the hemp plants to respective delivering systems, and placing the received parts of the hemp plants on the ground in at least two rows by the delivering systems.

18. The method according to claim 17, further comprising, during travel of the vehicle, first picking and cutting loose the upper parts of the hemp plants by the upper picking element and only then gripping the lower parts of the hemp plants by the lower picking element.

19. The method according to claim 17, further comprising receiving the upper parts and lower parts of the picked hemp plants separately and delivering the received and transported upper parts and lower parts of the picked hemp plants separately.

20. The method according to claim 17, further comprising placing the lower and upper parts on the ground surface separately.

21. The method according to claim 17, further comprising rotating the hemp plants during transport.

22. The method according to claim 17, further comprising pivoting one or more of the lower picking element and the upper picking element relative to the vehicle.

23. The method according to claim 17, further comprising cutting the top parts off the upper parts which have been cut loose.

24. The method according to claim 17, further comprising compacting the upper parts of the fiber plants.

25. The method according to claim 17, further comprising cutting the root parts off lower parts of the fiber plants.

26. The method according to claim 17, further comprising compacting the lower parts of the fiber plants.

* * * * *